US012583467B2

(12) United States Patent
Di Cairano et al.

(10) Patent No.: US 12,583,467 B2
(45) Date of Patent: Mar. 24, 2026

(54) SYSTEM AND METHOD FOR CONTROLLING MOTION OF AN EGO VEHICLE

(71) Applicant: Mitsubishi Electric Research Laboratories, Inc., Cambridge, MA (US)

(72) Inventors: Stefano Di Cairano, Newton, MA (US); Terrence Skibik, Boulder, CO (US); Abraham Vinod, Cambridge, MA (US); Avishai Weiss, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 294 days.

(21) Appl. No.: 18/190,851

(22) Filed: Mar. 27, 2023

(65) Prior Publication Data

US 2024/0326841 A1     Oct. 3, 2024

(51) Int. Cl.
*B60W 50/035*     (2012.01)
*B60W 60/00*     (2020.01)
*B60W 50/00*     (2006.01)

(52) U.S. Cl.
CPC ...... *B60W 50/035* (2013.01); *B60W 60/0015* (2020.02); *B60W 2050/0008* (2013.01); *B60W 2050/0026* (2013.01); *B60W 2555/60* (2020.02)

(58) Field of Classification Search
CPC .................. B60W 50/035; B60W 60/0015
See application file for complete search history.

(56) References Cited

U.S. PATENT DOCUMENTS

| | | | | |
|---|---|---|---|---|
| 11,919,526 B1* | 3/2024 | Agarwal | ............. | B60W 50/029 |
| 2014/0032049 A1* | 1/2014 | Moshchuk | ............. | G08G 1/166 |
| | | | | 701/42 |
| 2018/0087907 A1* | 3/2018 | DeBitetto | ............... | G01S 19/46 |
| 2020/0086837 A1* | 3/2020 | Le Cornec | .......... | B60W 50/029 |
| 2020/0340825 A1* | 10/2020 | Yamamoto | ......... | G01C 21/3679 |
| 2021/0078596 A1* | 3/2021 | Batkovic | ............. | G05D 1/0217 |

(Continued)

OTHER PUBLICATIONS

M. Althoff and J. M. Dolan, "Online verification of automated road vehicles using reachability analysis," IEEE Trans. Robotics, vol. 30, No. 4, pp. 903-918, 2014.

*Primary Examiner* — Jess Whittington
(74) *Attorney, Agent, or Firm* — Gene Vinokur

(57)     ABSTRACT

The present disclosure discloses a system and a method for controlling motion of an ego vehicle. The method includes collecting a feedback signal indicative of a current state of the ego vehicle and an environment, processing the feedback signal to determine a region of the state of the ego vehicle uplifted with admissible values of a control parameter, processing the feedback signal with a nominal controller to produce a nominal control command maintaining the state of the ego vehicle within the determined region, and evaluating a state function of an evasive controller with a value of the control parameter from the determined region to produce an evasive control command. The method further includes controlling the motion of the ego vehicle according to the nominal control command when the fault is not detected; and otherwise controlling the motion of the ego vehicle according to the evasive control command.

19 Claims, 14 Drawing Sheets

(56) References Cited

U.S. PATENT DOCUMENTS

| | | | |
|---|---|---|---|
| 2021/0197864 A1* | 7/2021 | Oltmann | B60W 60/007 |
| 2021/0237752 A1* | 8/2021 | Ewert | G05D 1/0033 |
| 2022/0121201 A1* | 4/2022 | Williams | B60W 60/0011 |
| 2023/0322208 A1* | 10/2023 | Rojas | B60W 50/085 |
| | | | 701/41 |
| 2024/0199068 A1* | 6/2024 | Pavone | B60W 60/001 |
| 2025/0083666 A1* | 3/2025 | Do | B60W 30/09 |

* cited by examiner

| Faults | Risk zone | Constraints | Traffic rules | Evasive Controller |
|--------|-----------|-------------|---------------|--------------------|
| 201 | 203 | 205 | 207 | 209 |
| Fault1 | Risk zone1 | Constraints1 | Traffic rules1 | Evasive controller1 |
| Fault2 | Risk zone2 | Constraints2 | Traffic rules2 | Evasive controller2 |
| . . . . . | . . . . . | . . . . . | . . . . . | . . . . . |
| FaultN | Risk zoneN | ConstraintsN | Traffic rulesN | Evasive controllerN |

200

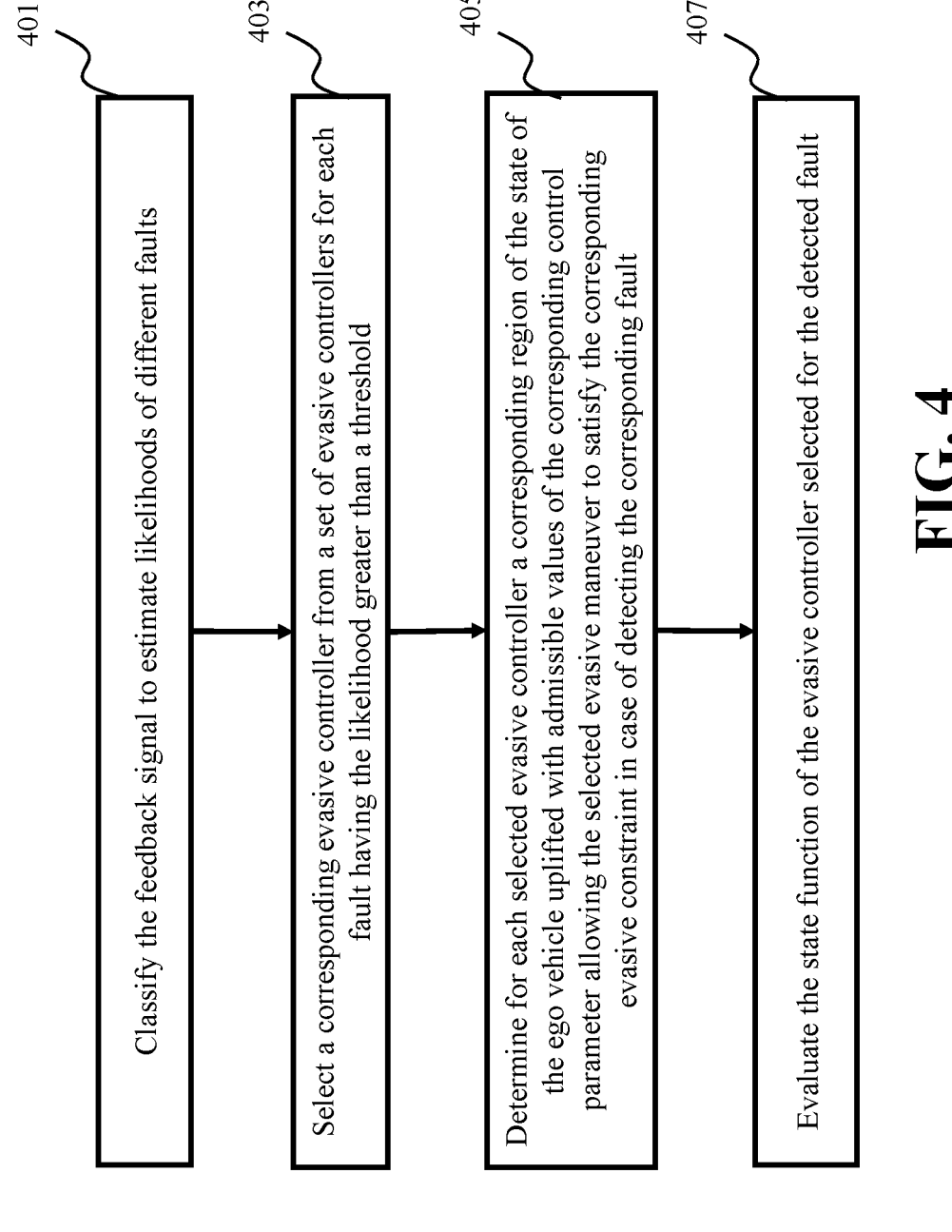

401   Classify the feedback signal to estimate likelihoods of different faults

403   Select a corresponding evasive controller from a set of evasive controllers for each fault having the likelihood greater than a threshold 405   Determine for each selected evasive controller a corresponding region of the state of the ego vehicle uplifted with admissible values of the corresponding control parameter allowing the selected evasive maneuver to satisfy the corresponding evasive constraint in case of detecting the corresponding fault 407   Evaluate the state function of the evasive controller selected for the detected fault

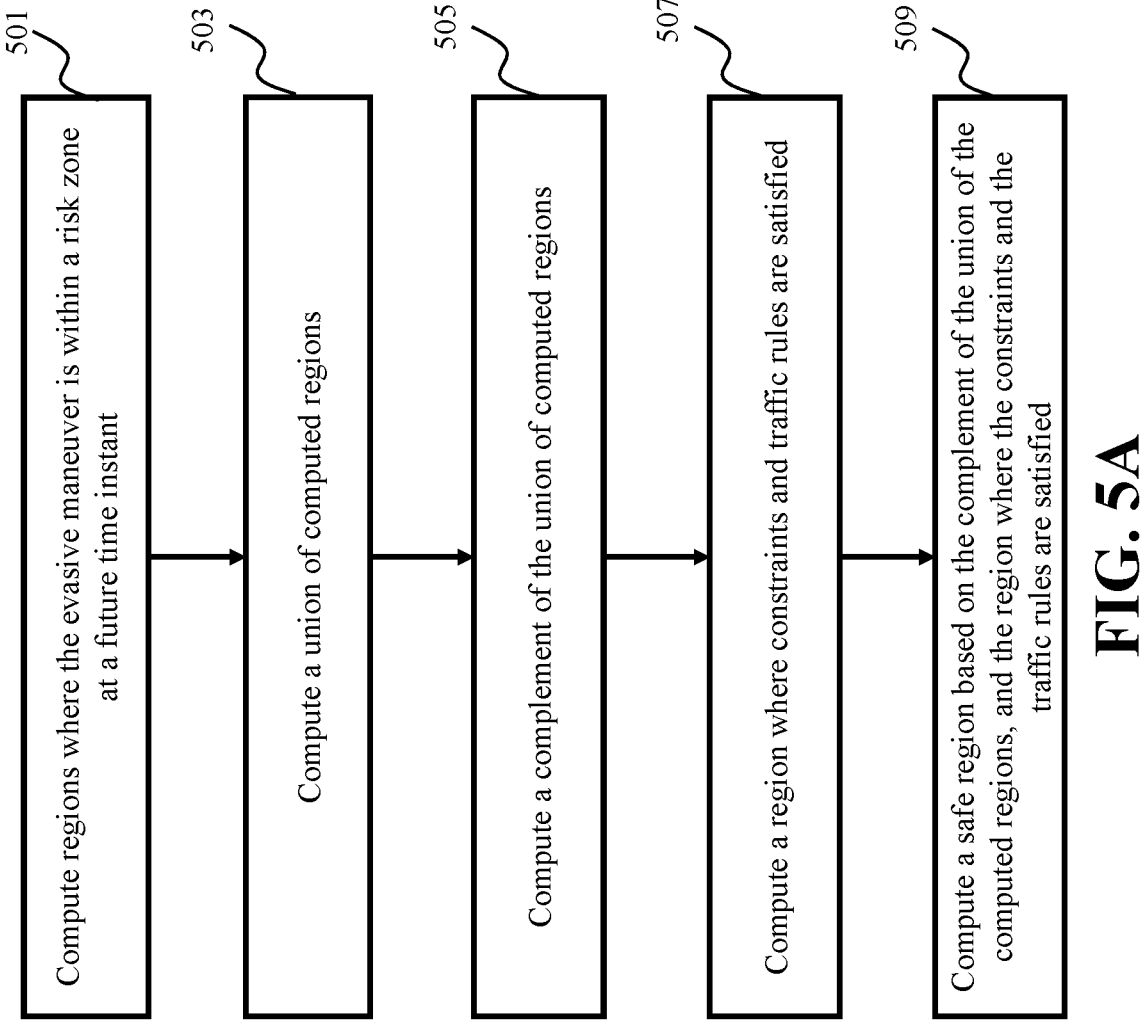

501

Compute regions where the evasive maneuver is within a risk zone at a future time instant

503

Compute a union of computed regions

505

Compute a complement of the union of computed regions

507

Compute a region where constraints and traffic rules are satisfied

509

Compute a safe region based on the complement of the union of the computed regions, and the region where the constraints and the traffic rules are satisfied

FIG. 5A

SYSTEM AND METHOD FOR CONTROLLING MOTION OF AN EGO VEHICLE

TECHNICAL FIELD

The present disclosure relates generally to vehicle control systems, and more particularly to a system and a method for controlling motion of an ego vehicle.

BACKGROUND

Automated vehicles operate in environments that are occupied by other "actors", such as other vehicles, bicycles, pedestrians, and the like. Automated Driving System (ADS) associated with an Ego Vehicle (EV) acquires information regarding the environment from on-board sensors or remote-connected sensors. Based on the acquired information, the ADS predicts future behavior of the environment and determines the best action that the EV shall execute in the environment. Such actions must account for (i) EV behavior with respect to the environment, (ii) existing traffic rules, and (iii) specifications on the EV operation that impose constraints on motion of the EV to ensure comfort of passengers of the EV.

In determining the actions for the EV, the ADS assumes that the information acquired from the on-board sensors or the remote-connected sensors is correct and complete, and the future behavior of the environment is correctly predicted. However, both the sensing and the prediction have limitations. For instance, a sensor may incorrectly classify an obstacle on a road, or the sensor may not detect an existing obstacle on the road, or an obstacle may be outside of a sensing range/field of view of the sensor. As other examples, an obstacle detected as stopped on a side of the road may be predicted to continue being stopped outside of the road, while suddenly the obstacle decides merging in traffic as the EV approaches, a vehicle may be predicted to continue being in the same lane, while instead the vehicle changes lane in front of the EV, a pedestrian predicted to remain outside of the road suddenly crosses the road in front of the EV. The aforesaid examples describe unexpected events with respect to the sensed and the predicted future behavior of the environment that the ADS used to plan the actions for the EV.

Despite such unexpected events, the EV must be maintained safe, i.e., collisions must be avoided, and certain key traffic rules must also be enforced. However, some lesser important criteria, such as lower importance traffic rules or specifications aimed at driver comfort, may be violated to maintain safety in face of the unexpected conditions. As an example, in a situation where the EV travels on a left lane and other vehicles travel on a right lane, the ADS computes a nominal plan based on a prediction that the other vehicles maintain their lanes. However, an actual motion of one of the other vehicles may cut in front of the EV, in a way that could lead to a collision. In this case, the ADS must engage an evasive maneuver that avoids entering a zone where there is risk of collision between the EV and the other vehicle. However, the evasive maneuver may be an aggressive sway maneuver that drives on road shoulder, where normally a vehicle should not drive but it may be acceptable as an emergency, as long as such road shoulder is free.

For controlling the EV in the environment, some approaches determine actions that satisfy (i)-(iii), even for the unexpected events. However, such actions may end up being conservative, resulting in the ADS commanding the EV not to move for "fear" that something unexpected may happen, meaning that it is difficult to satisfy (i)-(iii) under the unexpected events. Further, significant amount of computing time is consumed in determining such actions, which is counterproductive when the ADS must quickly react to an unexpected event. For instance, within a communication and computation period of 0.5 s, which is still short for planning in the unexpected events, a vehicle driving at 54 km/h moves 7.5 m, which may be a large loss of maneuvering space to avoid a collision with an obstacle appearing immediately ahead.

Therefore, there is still need for a system and a method capable of maintaining safety in presence of the unexpected events in the environment.

SUMMARY

It is an object of some embodiments to provide a system and a method for controlling motion of an ego vehicle while ensuring comfort and safety of passengers of the ego vehicle. Such a motion is referred herein to as nominal movement of the ego vehicle. As used herein, the ego vehicle may be any type of wheeled vehicle, such as a passenger car, a bus, or a rover. The ego vehicle may be an autonomous vehicle or a semi-autonomous vehicle. The nominal movement of the ego vehicle is governed by constraints and/or movement objectives. In case of the autonomous or semi-autonomous vehicles, the constraints and movement objectives can include staying on a road, staying in middle of a lane, maintaining nominal longitudinal velocity, and maintaining margin to surrounding objectives.

Additionally, it is an object of some embodiments to provide a system and a method for controlling the motion of the ego vehicle that anticipates and timely reacts to various scenarios that can potentially disrupt the constraints and the movement objectives of the nominal movement. Such a scenario is referred herein as a fault scenario or just as a fault. For example, when a car abruptly slows down in front of the ego-vehicle under control, it may be prudent to suddenly decelerate the ego-vehicle or swerve the ego vehicle to shoulder of a road even if such sudden maneuver may cause discomfort to the passengers or violate the constraint on maintaining the ego vehicle in driving lanes. As can be seen in this example, safety constraints prevail over the comfort of the passengers.

In some embodiments, the fault is a hypothetical scenario where the safety constraints of the nominal movement may be violated if an evasive maneuver is not performed. Additionally or alternatively, the fault is a scenario not considered/or anticipated during planning of the nominal movement. Such a scenario may arise when a controller of the ego vehicle responsible for the nominal movement predicts a current state and a future state of the motion of the ego vehicle on the road, but a neighboring vehicle suddenly changes its lane in a way which has not been anticipated by the controller, a pedestrian starts crossing the road outside of crosswalk, and/or when a sensor system of the ego-vehicle fails to correctly sense surrounding environment. Additionally or alternatively, the fault is a scenario causing an abrupt change of the nominal movement. For example, the controller may receive a sudden command from a driver or the passenger of the ego-vehicle requesting an immediate stop. Additionally or alternatively, the fault is a scenario requiring an immediate reaction of the controller, such as the ego vehicle encountering a mechanical or electrical failure of some of its component, requesting immediate stop to preserve safety.

To that end, it is an objective of some embodiments to control the nominal movement of the ego vehicle in the case when there is no fault, and to execute the evasive maneuver in case of the fault. To achieve such an objective, the present disclosure provides a nominal controller and an evasive controller. The nominal controller is configured to control the nominal movement of the ego vehicle subject to a nominal constraint. The evasive controller is configured to control an evasive maneuver of the ego vehicle subject to an evasive constraint different from the nominal constraint. Examples of the evasive maneuver include emergency stop, emergency lane change, emergency double lane change, emergency slowdown, and emergency speed-up.

The nominal controller and the evasive controller use different control designs for nominal control and evasive control. For example, the nominal controller is based on principles of optimal control for controlling the nominal movement to improve efficiency in achieving the objective of the vehicle motion and the evasive controller is based on principles of reactive feedback control for controlling the evasive maneuver to react to the fault. Specifically, some embodiments are based on the realization that the evasive maneuver can be represented by a state update function dependent on a control parameter. The state update function can be determined in advance, while a value of the control parameter can be determined during controlling of the ego vehicle. Examples of the control parameter include values of stop point, lateral displacement, target velocity, and the like. The difference of a control parameter with a control signal, is that the control parameter remains constant during a maneuver while the control signal may vary during the maneuver. Thus, a maneuver defined by control signal requires definition of many values, while a maneuver defined by a control parameter, requires definition of a single value. Different evasive maneuvers may use different control parameters. In such a manner, the nominal controller and the evasive controller are disentangled.

The reactive feedback control for the evasive maneuver is advantageous because when the control parameter is determined, evaluation of the state function with the control parameter is fast. Hence, an evasive control command for the evasive maneuver can be determined promptly. However, despite this advantage, disentanglement of the nominal controller and the evasive controller creates additional problems addressed by some embodiments.

An evasive maneuver depends on a state of the ego vehicle and on a state of an environment of motion of the ego vehicle. For example, an emergency lane change may depend on a speed of the ego vehicle, presence of other vehicles and/or pedestrians limiting admissible space for turning the ego vehicle, and the like. For different values of the state of the ego vehicle and the state of the environment, different values of the control parameter, such as lateral displacement, may allow the evasive maneuver to succeed. Moreover, for some values of the state of the ego vehicle and the state of the environment, such a control parameter may not exist, i.e., the value of such a control parameter may be outside of a range of its admissible values. Hence, there is a need to determine a value of the control parameter allowing the evasive maneuver to succeed.

Conversely, the evasive controller controls the motion of the ego vehicle only in case of the fault. If no fault is detected, the nominal movement is controlled by the nominal controller. If the nominal controller operates under an assumption of no fault, the nominal controller may place the ego vehicle in a state where no evasive maneuver succeeds. Hence, there is a need to avoid such a scenario while maintaining the disentanglement of the nominal controller and the evasive controller.

Some embodiments are based on the realization that a feedback signal indicative of a current state of the ego vehicle and a current state of the environment of motion of the ego vehicle can be processed to determine a region of the state of the ego vehicle uplifted with admissible values of the control parameter allowing an evasive maneuver to succeed in case of detecting the fault. For an evasive maneuver to succeed means that a corresponding evasive maneuver avoids endangering safety of the ego vehicle, which amounts to satisfy the evasive constraint. When such a region of the state of the ego vehicle is determined, the region can be constructed as a constraint for the nominal controller forcing it to produce a nominal control command maintaining the state of the ego vehicle within the region of the state of the ego vehicle. Using the region of the state of the ego vehicle as an additional constraint preserves the disentanglement of the nominal controller and the evasive controller, while providing certainty that there is always at least a value of the control parameter of the evasive maneuver that is admissible, and hence that the evasive maneuver will succeed.

The value of the control parameter is governed by the region of the state of the ego vehicle uplifted with admissible values of the control parameter. Using the region of the state of the vehicle, the nominal controller can determine the value of the control parameter, e.g., as part of the optimization problem. Such an approach simplifies execution of the evasive controller. Additionally or alternatively, the value of the control parameter for the evasive controller is selected according to the region of the state of the ego vehicle, based on the state of the ego vehicle when the fault is detected.

The region of the state of the ego vehicle uplifted with admissible values of the control parameter can be determined before the fault is detected, e.g., concurrently with the operation of the nominal controller. Thus, no computational time is wasted in case of detecting the fault. Also, the determination of the region of the state of the ego vehicle can be executed before the ego vehicle operates, and the evaluation of the region of the state of the ego vehicle is computationally cheaper than the evaluation of results of the evasive control command.

Accordingly, one embodiment discloses a control system for controlling motion of an ego vehicle. The control system comprises a memory configured to store a nominal controller for controlling a nominal motion of the ego vehicle subject to a nominal constraint and an evasive controller for controlling an evasive maneuver of the ego vehicle subject to an evasive constraint different from the nominal constraint, wherein the nominal controller is configured to produce a nominal control command according to a movement objective of the ego vehicle, wherein the evasive controller is configured to produce an evasive control command by evaluating a state function of a control parameter; and a processor coupled with executable instructions, when executed by the processor, cause the control system to: collect a feedback signal indicative of a current state of the ego vehicle and a current state of an environment of motion of the ego vehicle; process the feedback signal to determine a region of the state of the ego vehicle uplifted with admissible values of the control parameter allowing the evasive maneuver to satisfy the evasive constraint in case of detecting a fault; process the feedback signal with the nominal controller to produce the nominal control command maintaining the state of the ego vehicle within the determined region of the state of the ego vehicle; evaluate the state function of the evasive controller with a value of the control parameter from the determined region of the state of the ego vehicle to produce the evasive control command; and control the motion of the ego vehicle according to the nominal control command when the fault is not detected; and otherwise control the motion of the ego vehicle according to the evasive control command.

Accordingly, another embodiment discloses a method for controlling motion of an ego vehicle, wherein the method uses a processor coupled to a memory storing a nominal controller for controlling a nominal motion of the ego vehicle subject to a nominal constraint and an evasive controller for controlling an evasive maneuver of the ego vehicle subject to an evasive constraint different from the nominal constraint, wherein the nominal controller is configured to produce a nominal control command according to a movement objective of the ego vehicle, wherein the evasive controller is configured to produce an evasive control command by evaluating a state function of a control parameter, the processor is coupled with stored instructions when executed by the processor carry out steps of the method, comprising: collecting a feedback signal indicative of a current state of the ego vehicle and a current state of an environment of motion of the ego vehicle; processing the feedback signal to determine a region of the state of the ego vehicle uplifted with admissible values of the control parameter allowing the evasive maneuver to satisfy the evasive constraint in case of detecting a fault; processing the feedback signal with the nominal controller to produce the nominal control command maintaining the state of the ego vehicle within the determined region of the state of the ego vehicle; evaluating the state function of the evasive controller with a value of the control parameter from the determined region of the state of the ego vehicle to produce the evasive control command; and controlling the motion of the ego vehicle according to the nominal control command when the fault is not detected; and otherwise controlling the motion of the ego vehicle according to the evasive control command.

Accordingly, yet another embodiment discloses a non-transitory computer readable storage medium embodied thereon a program executable by a processor for performing a method, the storage medium stores a nominal controller for controlling a nominal motion of the ego vehicle subject to a nominal constraint and an evasive controller for controlling an evasive maneuver of the ego vehicle subject to an evasive constraint different from the nominal constraint, wherein the nominal controller is configured to produce a nominal control command according to a movement objective of the ego vehicle, wherein the evasive controller is configured to produce an evasive control command by evaluating a state function of a control parameter, the program when executed by the processor carry out steps of the method, comprising: collecting a feedback signal indicative of a current state of the ego vehicle and a current state of an environment of motion of the ego vehicle; processing the feedback signal to determine a region of the state of the ego vehicle uplifted with admissible values of the control parameter allowing the evasive maneuver to satisfy the evasive constraint in case of detecting a fault; processing the feedback signal with the nominal controller to produce the nominal control command maintaining the state of the ego vehicle within the determined region of the state of the ego vehicle; evaluating the state function of the evasive controller with a value of the control parameter from the determined region of the state of the ego vehicle to produce the evasive control command; and controlling the motion of the ego vehicle according to the nominal control command when the fault is not detected; and otherwise controlling the motion of the ego vehicle according to the evasive control command.

BRIEF DESCRIPTION OF THE DRAWINGS

FIG. 4 shows a block diagram for selecting an evasive controller, according to an embodiment to the present disclosure.

FIG. 5A shows a block diagram for determining a safe region, according to some embodiment of the present disclose.

Figure 1A:
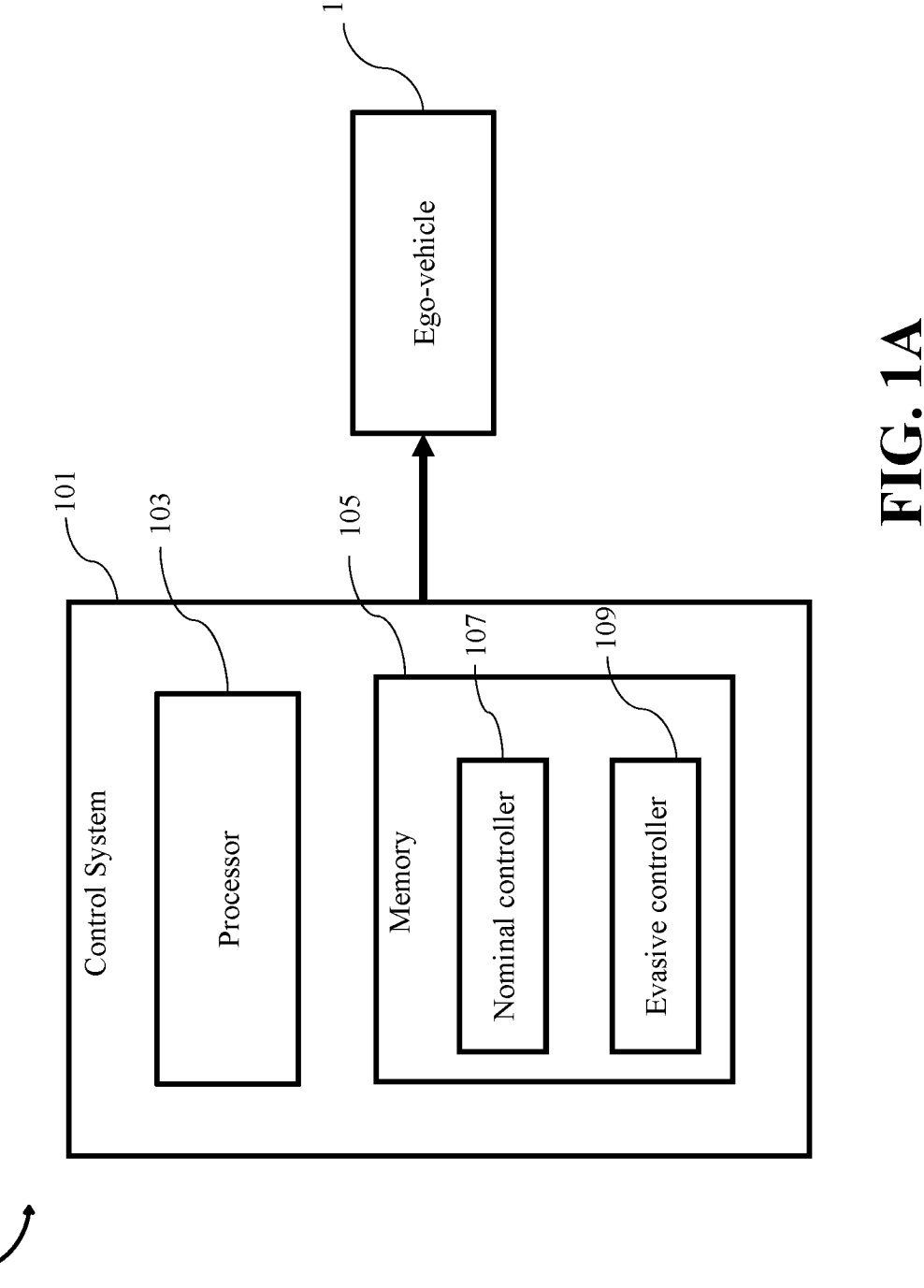
FIG. 1A illustrates a block diagram for controlling motion of an ego vehicle, according to some embodiments of the present disclosure.

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

It is an object of some embodiments to control motion of an ego vehicle while ensuring comfort and safety of passengers of the ego vehicle. Such a motion is referred herein to as nominal movement of the ego vehicle. The nominal movement of the ego vehicle is governed by constraints and/or movement objectives. In case of autonomous or semi-autonomous vehicles, the constraints and movement objectives can include staying on a road, staying in middle of a lane, maintaining nominal longitudinal velocity, and maintaining margin to surrounding objectives.

Additionally, it is an object of some embodiments to provide a system and a method for controlling the motion of the ego vehicle that anticipates and timely reacts to various scenarios that can potentially disrupt the constraints and the movement objectives of the nominal movement. Such a scenario is referred to herein as a fault scenario or just as a fault. For example, when a car abruptly slows down in front of the ego-vehicle under control, it may be prudent to suddenly decelerate the ego-vehicle or swerve the ego vehicle to shoulder of a road even if such sudden maneuver may cause discomfort to the passengers or violate the constraint on maintaining the ego vehicle in driving lanes. As can be seen in this example, safety constraints prevail over the comfort of the passengers.

In some embodiments, the fault is a hypothetical scenario where the safety constraints of the nominal movement may be violated if an evasive maneuver is not performed. Additionally or alternatively, the fault is a scenario not considered and/or anticipated during planning of the nominal movement. Such a scenario may arise when a controller of the ego vehicle responsible for the nominal movement predicts a current state and a future state of the motion of the ego vehicle on the road, but a neighboring vehicle suddenly changes its lane in a way which has not been anticipated by the controller, a pedestrian starts crossing the road outside of crosswalk, and/or when a sensor system of the ego-vehicle fails to correctly sense surrounding environment. Additionally or alternatively, the fault is a scenario causing an abrupt change of the nominal movement. For example, the controller may receive a sudden command from a driver or the passenger of the ego-vehicle requesting an immediate stop. Additionally or alternatively, the fault is a scenario requiring an immediate reaction of the controller, such as the ego vehicle encountering a mechanical or electrical failure of some of its component, requesting immediate stop to preserve safety.

To that end, it is an object of some embodiments to provide a system for controlling the nominal movement of the ego vehicle in the case when there is no fault and to execute the evasive maneuver in case of the fault. Such a system is described below in FIG. 1A.

FIG. 1A illustrates a block diagram 100 for controlling motion of an ego vehicle 111, according to some embodiments of the present disclosure. A control system 101 is communicatively coupled to the ego vehicle 111. As used herein, the ego vehicle 111 may be any type of wheeled vehicle, such as a passenger car, a bus, or a rover. The ego vehicle 111 may be an autonomous vehicle or a semi-autonomous vehicle.

The control system 101 includes a processor 103 and a memory 105. The processor 103 may be a single core processor, a multi-core processor, a computing cluster, or any number of other configurations. The memory 105 may include random access memory (RAM), read only memory (ROM), flash memory, or any other suitable memory systems. Additionally, in some embodiments, the memory 105 may be implemented using a hard drive, an optical drive, a thumb drive, an array of drives, or any combinations thereof. The memory 105 is configured to store a nominal controller 107 and an evasive controller 109. The nominal controller 107 is configured to control a nominal movement of the ego vehicle 111 subject to a nominal constraint. The evasive controller 109 is configured to control an evasive maneuver of the ego vehicle 111 subject to an evasive constraint different from the nominal constraint. Examples of the evasive maneuver include emergency stop, emergency lane change, emergency double lane change, emergency slowdown, and emergency speed-up. The control system 101 is configured to control the motion of the ego-vehicle 111. The control system 101 executes functions described below in FIG. 1B to control the motion of the ego-vehicle 111.

Figure 1B:
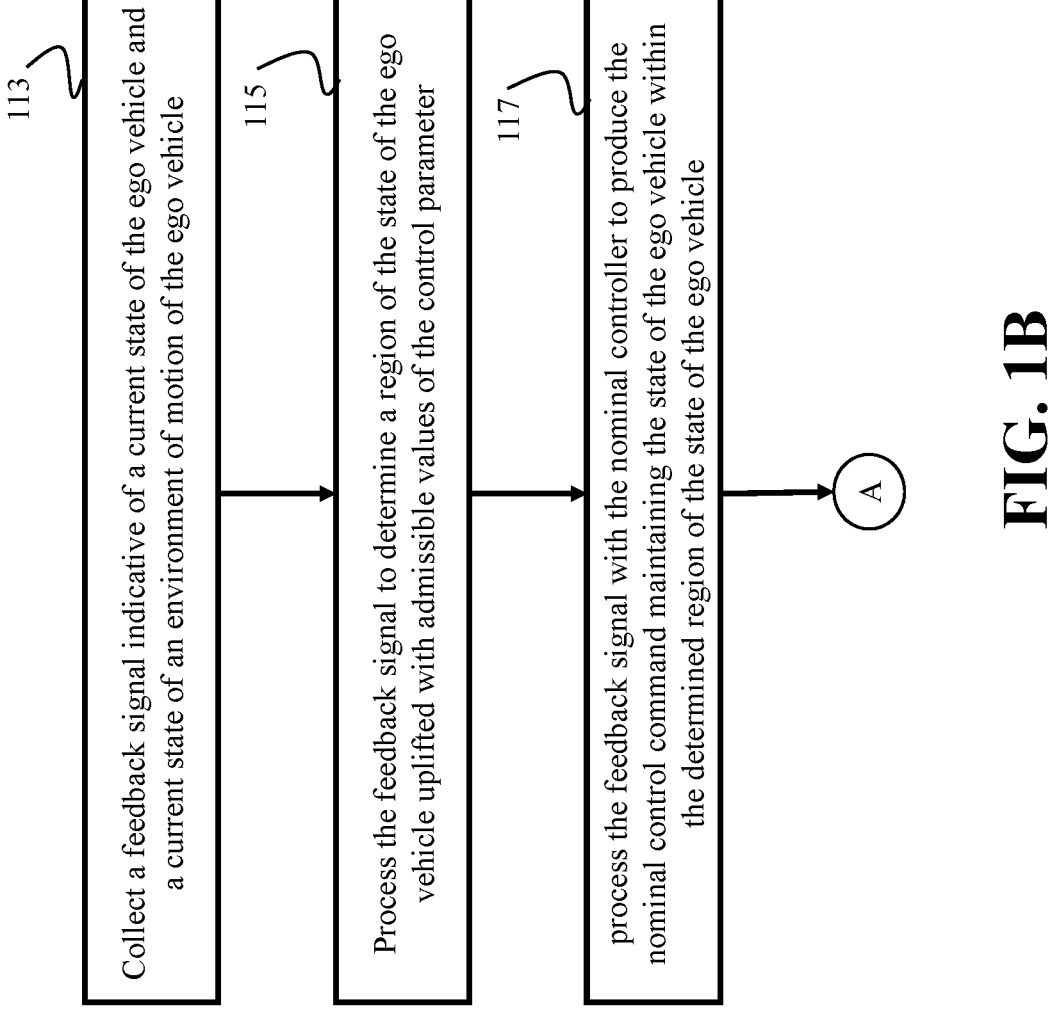
FIG. 1B shows a block diagram of functions executed by a control system for controlling the motion of the ego-vehicle, according to some embodiments of the present disclosure.
Figure 1B:
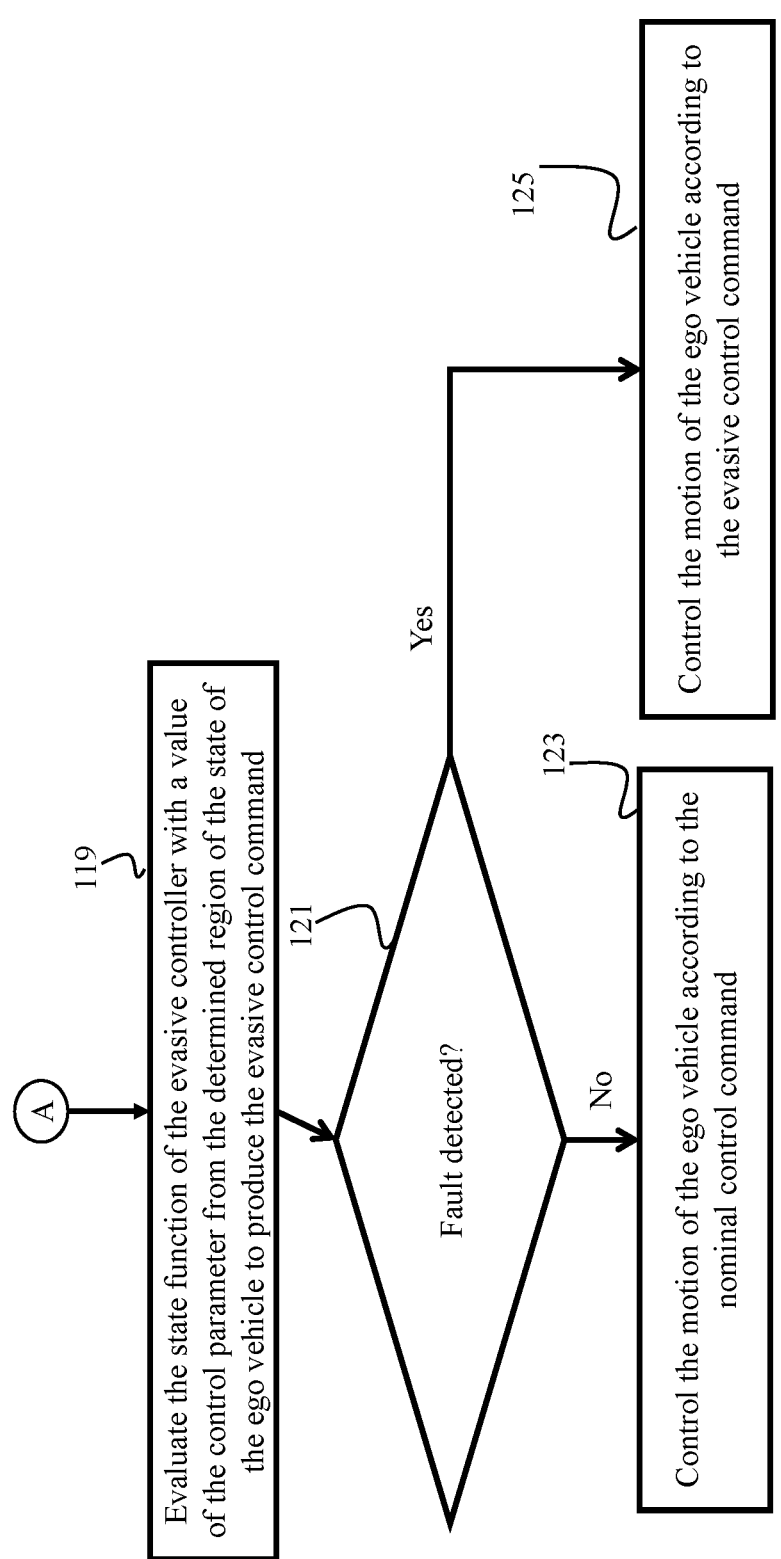

FIG. 1B shows a block diagram of functions executed by the control system 101 for controlling the motion of the ego-vehicle 111, according to some embodiments of the present disclosure. The nominal controller 107 and the evasive controller 109 use different control theories for nominal control and evasive control. For example, the nominal controller 107 is based on principles of optimal control for controlling the nominal movement to improve control efficiency and the evasive controller 109 is based on principles of reactive feedback control for controlling the evasive maneuver to improve reaction to the fault. Specifically, some embodiments are based on a realization that the evasive maneuver can be represented by a state function dependent on a control parameter. The state function can be determined in advance, while a value of the control parameter can be determined during control of the ego vehicle 111. Examples of the control parameter include values of stop point, lateral displacement, target velocity, and the like. The difference of the control parameter with a control signal, is that a value of the control parameter remains constant through the evasive maneuver while the control signal may vary during the evasive maneuver. Thus, the evasive maneuver defined by the control signal requires definition of many values, while the evasive maneuver defined by the control parameter, requires definition of a single value. Different evasive maneuvers may use different control parameters. In such a manner, the nominal controller 107 and the evasive controller 109 are disentangled.

The reactive feedback control for the evasive maneuver is advantageous because when the control parameter is determined, evaluation of the state function with the control parameter is fast. Hence, an evasive control command for the evasive maneuver can be determined promptly. However, despite this advantage, disentanglement of the nominal controller 107 and the evasive controller 109 creates additional problems addressed by some embodiments.

An evasive maneuver depends on a state of the ego vehicle 111 and a state of an environment of motion of the ego vehicle 111. For example, an emergency lane change may depend on a speed of the ego vehicle 111, presence of other vehicles and/or pedestrians limiting admissible space for turning the ego vehicle 111, and the like. For different values of the state of the ego vehicle 111 and the state of the environment, different values of the control parameter, such as lateral displacement, may allow the evasive maneuver to succeed. Moreover, for some values of the state of the ego vehicle 111 and the state of the environment, such a control parameter may not exist, i.e., the value of such a control parameter may be outside of a range of its admissible values. Hence, there is a need to determine a value of the control parameter allowing the evasive maneuver to succeed.

Conversely, the evasive controller 109 controls the motion of the ego vehicle 111 only in case of the fault. If no fault is detected, the nominal movement is controlled by the nominal controller 107. If the nominal controller 107 operates under an assumption of no fault, the nominal controller 107 may place the ego vehicle 111 in a state where no evasive maneuver succeeds. Hence, there is a need to avoid such a scenario while maintaining the disentanglement of the nominal controller 107 and the evasive controller 109.

Some embodiments are based on the realization that that a feedback signal indicative of a current state of the ego vehicle 111 and a current state of the environment of motion of the ego vehicle 111 can be processed to determine a region of the state of the ego vehicle 111 uplifted with admissible values of the control parameter allowing an evasive maneuver to succeed in case of detecting the fault. For an evasive maneuver to succeed means that a corresponding evasive maneuver avoids endangering safety of the ego vehicle 111, which amounts to satisfy the evasive constraint. When such a region of the state of the ego vehicle 111 is determined, the region can be served as a constraint for the nominal controller 107 forcing it to produce a nominal control command maintaining the state of the ego vehicle 111 within the region of the state of the ego vehicle 111. Using the region of the state of the ego vehicle 111 as an additional constraint preserves the disentanglement of the nominal controller 107 and the evasive controller 109 while providing certainty that there is always at least a value of the control parameter of the evasive maneuver that is admissible, and hence that the evasive maneuver will succeed.

To that end, at block 113, the processor 103 collects the feedback signal indicative of the current state of the ego vehicle 111 and the current state of an environment of motion of the ego vehicle 111. The current state of the ego vehicle 111 includes one or combination of an acceleration of the ego vehicle 111, a velocity of the ego vehicle 111, a position of the ego vehicle 111, a steering angle of the ego vehicle 111, and the like. The current state of the environment includes states of neighboring vehicles, presence of pedestrians, weather conditions affecting tire friction, and the like. The feedback signal may be collected from sensors associated with the ego-vehicle 111. Examples of the sensors include global positioning system (GPS), accelerometers, inertial measurement units, gyroscopes, shaft rotational sensors, torque sensors, deflection sensors, pressure sensor, and flow sensors. The ego vehicle 111 also includes sensors for sensing the current state of the environment, such as distance range finders, radars, lidars, and cameras. Alternatively or concurrently, sensor data on the environment can be received from sensors that are placed remotely with respect to the ego vehicle 111.

At block 115, the processor 103 processes the feedback signal to determine the region of the state of the ego vehicle 111 uplifted with admissible values of the control parameter allowing the evasive maneuver to satisfy the evasive constraint in case of detecting the fault. Such a region of the state of the ego vehicle 111 uplifted with admissible values of the control parameter is also referred to as 'a safe region'.

At block 117, the processor 103 processes the feedback signal with the nominal controller 107 to produce the nominal control command maintaining the state of the ego vehicle 111 within the determined region of the state of the ego vehicle 111.

At block 119, the processor 103 evaluates the state function of the evasive controller 109 with a value of the control parameter from the determined region of the state of the ego vehicle 111 to produce the evasive control command. For example, in an embodiment, the evasive controller 109 computes the evasive control command to generate the evasive maneuver by summing a first term and a second term, wherein the first term in obtained by multiplying the state of the ego vehicle 111 by a first constant matrix gain and the second term is obtained by multiplying the control parameter by a second constant matrix gain.

At block 121, the processor 103 checks if the fault is detected. If the fault is not detected, then, at block 123, the processor 103 controls the motion of the ego vehicle 111 according to the nominal control command. If the fault is detected, then, at block 125, the processor 103 controls the motion of the ego vehicle 111 according to the evasive control command.

The region of the state of the ego vehicle 111 uplifted with admissible values of the control parameter can be determined before the fault is detected, e.g., concurrently with operation of the nominal controller 107. Thus, no computational time is wasted in case of detecting the fault. Also, the determination of the region of the state of the ego vehicle 111 can be executed before the ego vehicle 111 operates, and evaluation of the region of the state of the ego vehicle 111 is computationally cheaper than evaluation of results of the evasive control command.

The value of the control parameter is governed by the region of the state of the vehicle uplifted with admissible values of the control parameter. Using this region, the nominal controller 107 can determine the value of the control parameter. For example, the nominal controller 107 solves an optimization problem to produce the nominal control command and the value of the control parameter for the evasive controller 109. Such an approach simplifies the execution of the evasive controller 109. Additionally or alternatively, the value of the control parameter for the evasive controller 109 is selected according to the region of the state of the ego vehicle 1111, based on the state of the ego vehicle 111 when the fault is detected.

In an embodiment, different faults (or failure scenarios) are pre-defined and their corresponding risk zones, constraints to be satisfied, traffic rules to be satisfied, and evasive maneuvers, are included into a table. Such a table is stored in the memory 105 of the control system 101. The risk zone refers to an area that the ego-vehicle 111 must avoid in the presence of the fault. The constraints, for instance, include limits on the velocity, the acceleration, the steering angle, and the like. Examples of the traffic rules include lane limits, boundary limits, speed limits, regions of road where the ego vehicle 111 shouldn't drive, and the like. In some embodiments, the traffic rules that have to be satisfied when the fault is detected may exclude traffic rules of lesser importance, e.g., driving on road shoulder, to ensure the safety.

Figure 2:
FIG. 2 illustrates a table including different pre-defined faults, according to an embodiment of the present disclosure.

FIG. 2 illustrates a table 200 including different pre-defined faults, according to an embodiment of the present disclosure. The table 200 includes a faults column 201, a risk zone column 203, a constraints column 205, a traffic rules column 207, and evasive controllers column 209.

The faults column 201 includes different faults, such as, fault1, fault2, . . . ,faultN. The risk zone column 203 includes different risk zones corresponding to the different faults, such as, risk zone1, risk zone2, . . . ,risk zoneN. The constraints column 205 includes different constraints to be satisfied corresponding to the different faults, such as, constraints1, constraints2, . . . ,constraintsN. The traffic rules column 207 includes different sets of traffic rules to be satisfied corresponding to the different faults, such as, traffic rules1, traffic rules2, . . . ,traffic rulesN.

The evasive controllers column 209 includes different evasive controllers corresponding to the different faults, such as, evasive controller1, evasive controller2, . . . , evasive controllerN. The different evasive controllers are used for controlling different evasive maneuvers of the ego vehicle 111 subject to corresponding evasive constraints different from the nominal constraint, wherein each of the different evasive controllers is configured to produce a corresponding evasive control command by evaluating a corresponding state function dependent on a corresponding control parameter.

The table 200 is stored in the memory 105 of the control system 101. The processors 103 uses the table 200 for controlling the evasive maneuver of the ego vehicle 111 when the fault is detected, as described below in FIG. 3.

Figure 3:
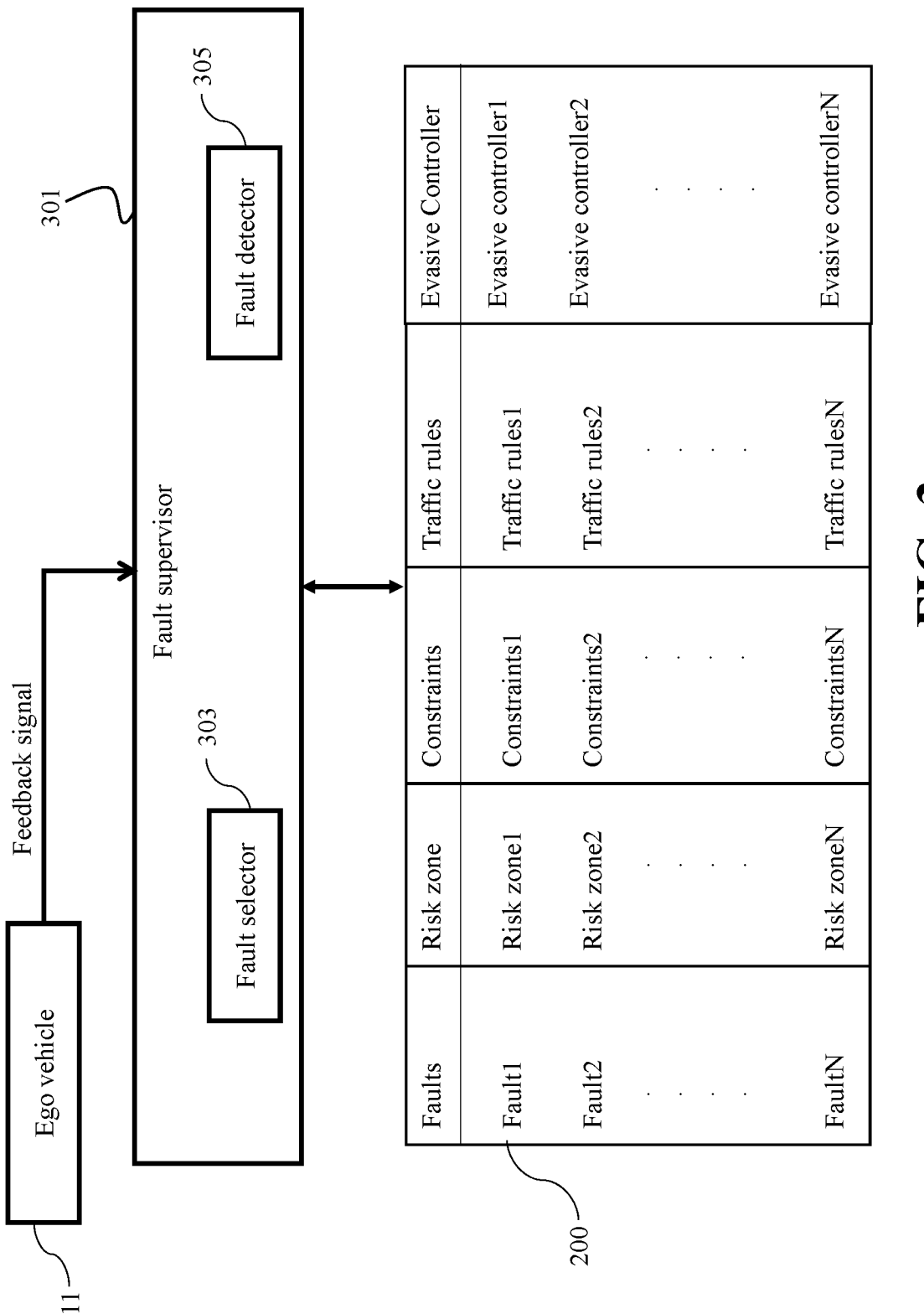
FIG. 3 shows a schematic for controlling the ego-vehicle using the table, when a fault is detected, according to some embodiments of the present disclosure.

FIG. 3 shows a schematic for controlling the ego-vehicle 111 using the table 200, when the fault is detected, according to some embodiments of the present disclosure. The processor 103 receives, from the sensors associated with the ego-vehicle 111, the feedback signal indicative of the current state of the ego vehicle 111 and the current state of the environment. The feedback signal is input to a fault supervisor 301. In an embodiment, the fault supervisor 301 is stored in the memory 105 of the control system 101. The fault supervisor 301 is executed by the processor 103. The fault supervisor 301 includes a fault selector 303 and a fault detector 305.

The fault selector 303 is configured to determine, based on the feedback signal, possible faults that may occur in the present environment. Based on the determined possible faults, the risk zones to be avoided, the constraints to be satisfied, the traffic rules to be satisfied, and the evasive maneuver to be executed, are selected from the table 200. For example, based on the feedback signal, the fault selector 303 determines that the fault1 and fault2 may occur. The processor 103 determines, from the table 200, that in case the fault1 occurs, the risk zone1 is to be avoided, the constraints1 are to be satisfied, the traffic rules1 are to be satisfied by executing the evasive controller1. Similarly, the processor 103 determines, from the table 200, that in case the fault2 occurs, the risk zone2 is to be avoided, the constraints2 are to be satisfied, the traffic rules2 are to be satisfied by executing the evasive controller2.

The fault detector 305 is configured to detect if any of the determined possible faults has occurred in the environment. Based on the detected fault, the corresponding evasive controller is executed. For instance, the fault detector 303 detects that fault2 has occurred. Subsequently, the processor 103 executes the corresponding evasive controller2. The evasive controller2 is configured to produce a corresponding evasive control command by evaluating a corresponding state function dependent on a corresponding control parameter The evasive controller2 produces the evasive control command for the ego vehicle 111 such that the risk zone2 is avoided while satisfying the corresponding constraints2 and the traffic rules2. Further, the processor 103 controls the motion of the ego vehicle 111 according to the produced evasive control command.

In some other embodiments, the faults are not pre-defined rather the faults and the corresponding evasive maneuvers are determined during real-time operation of the ego-vehicle 111. For instance, in an embodiment, the fault selector 303 uses a neural network $$\left( \left\{ \mathcal{F}_r^{(m)} \right\}_{m \in \mathcal{M}_t}, \mathcal{T}_t \right) = NN_{FSS}(\mathcal{S}_s)$$

that receives as input the information $\mathcal{S}_s$ acquired by the sensors associated with the ego vehicle 111 (e.g., the feedback signal) and produces information of the faults $\mathcal{F}_t^{(m)}\}_{m \in \mathcal{M}_t}$, i.e., for each fault m, $\mathcal{F}_t^{(m)}$ includes a corresponding risk zone, a corresponding constraint and traffic rules to be satisfied, and a corresponding evasive maneuver. The neural network is trained on driving data including different states of the ego vehicle 111 and different states of the environment. Examples of such a neural network include sequential neural networks, recurrent neural networks, auto-encoder neural networks, convolutional neural network generative neural networks, long/short term memory network, and belief networks.

Further, in an embodiment, the fault detector 305 uses a neural network $$m = NN_{FSS}(\mathcal{S}_s)$$

that receives as input the information $\mathcal{S}_s$ acquired by the sensors associated with the ego vehicle 111 (e.g., the feedback signal) and returns a value m indicative of the nominal or evasive maneuver to be used, where specifically m=0 is returned to indicate the nominal movement, while another value of m indicates that m-th evasive maneuver is to be used. The neural network used by the fault detector 305 is trained on driving data including different states of the ego vehicle 111 and different states of the environment. Examples of the neural network include sequential neural networks, recurrent neural networks, auto-encoder neural networks, convolutional neural network generative neural networks, long/short term memory network, and belief networks.

Some embodiments classify likelihoods of different faults and select the evasive controller based on the fault and its likelihood. For example, different evasive maneuvers can be associated with different faults and selection of a specific evasive maneuver depends on detection of a specific fault. Such an embodiment is described below in FIG. 4.

FIG. 4 shows a block diagram 400 for selecting the evasive controller, according to an embodiment to the present disclosure. The memory 105 is configured to store a set of evasive controllers for controlling different evasive maneuvers of the vehicle subject to corresponding evasive constraints different from the nominal constraint, wherein each of the different evasive controllers is configured to produce a corresponding evasive control command by evaluating a corresponding state function dependent on a corresponding control parameter. At block 401, the processor 103 classifies the feedback signal to estimate likelihoods of different faults. Each fault of the different faults defines a risk zone of the ego vehicle. To classify the feedback signal, the processor 101 executes a neural network trained with machine learning that produces probabilities of each of the different faults and retains the faults with a sufficient probability, e.g., greater than zero for full safety, or greater than a certain used-defined small probability threshold for probabilistic safety.

At block 403, the processor 103 selects a corresponding evasive controller from the set of evasive controllers for each fault having the likelihood greater than a threshold. The threshold may be defined by a user. At block 405, the processor 103 determines for each selected evasive controller a corresponding region of the state of the ego vehicle uplifted with admissible values of the corresponding control parameter allowing the selected evasive maneuver to satisfy the corresponding evasive constraint in case of detecting the corresponding fault. At block 407, the processor 103 evaluates the state function of the evasive controller selected for the detected fault, with a value of the corresponding control parameter from the region of the state of the ego vehicle uplifted with admissible values of the corresponding control parameter.

The determination of the faults, the evasive maneuvers, the safe region, and control commands for the ego vehicle 111 are mathematically described below.

Nominal Driving Conditions

The nominal driving conditions are defined as those where the ego vehicle 111 is operating normally, that is, the ego vehicle's 111 systems are sufficiently active, and the environment is perceived and predicted with a sufficient precision. Under the nominal driving conditions, the control system 101 plans the motion of the ego vehicle 111 according to a complete set of current traffic rules and constraints.

Under the nominal driving conditions, the control system 101 predicts the motion of the ego vehicle 111 according to a nominal model of vehicle motion $$x_{t+1}^{(0)} = f^{(0)}\left(x_t^{(0)}, u_t\right) \tag{1}$$

where t is time or time index, $x^{(0)}$ is a state of the nominal movement of the ego vehicle 111, which includes, for instance, the position, the velocity, the acceleration, and the like. u is the nominal control command (to the ego vehicle 111), which may include, for instance, actual or desired velocity, actual or desired acceleration, actual or desired steering angle, and the like, and $f^{(0)}$ is a state update function that defines the ego-vehicle's 111 motion. For instance $f^{(0)}$ may be defined by a kinematic bicycle model of vehicle motion:

$$\dot{p}_x = v \cos(\Psi) \tag{2}$$

$$\dot{p}_y = v \sin(\Psi)$$

$$\dot{\Psi} = \frac{v}{L_a}\tan(\delta)$$

$$\dot{v} = a$$

$$\dot{\delta} = \sigma$$

where $p=(p_x, p_y)$ is a position in a global frame, $v$ is velocity, $\psi$ is a heading angle in the global frame, $L_a$ is wheelbase, a is the acceleration, $\delta$ is the steering angle, $\sigma$ is a steering angular rate. For instance, when (1) uses the vehicle model (2), the ego vehicle's 111 state is $x=(p_x, p_y, \psi, v, \delta)$, $u=(a, \sigma)$ while $L_a$ is just a vehicle (constant and known) parameter.

The control system 101 constructs the traffic rules and vehicle rules as constraints on the state and commands of the ego vehicle 111. The constraints include, for instance, limits on the velocity and the acceleration, which are intended to ensure smooth vehicle operation and driver comfort under the nominal driving conditions. Such constraints are represented by $$\left(x_t^{(0)}, u_t\right) \in V^{(0)} \tag{3a}$$

where $V^{(0)}$ is a set where the constraints are satisfied. For instance, (3a) may be defined by inequalities such as $$a_{min}^{(m)} \le a \le a_{max}^{(m)}, \delta_{min}^{(m)} \le \delta \le \delta_{max}^{(m)}, \tag{3b}$$

$$\sigma_{min}^{(m)} \le \sigma \le \sigma_{max}^{(m)}$$

where symbols with subscripts min and max indicate lower and upper bounds for the corresponding variables, and m=0 for the nominal movement. The traffic rules include, for instance, lane limits, boundary limits, speed limits, regions of road where vehicle shouldn't drive, lanes that shall not be crossed, and the like. The control system 101 constructs such traffic rules by constraints $$\left(x_t^{(0)}, u_t\right) \in T^{(0)} \tag{4a}$$

where $T^{(0)}$ is a set where the traffic rules are satisfied. For instance, (4a) may be defined by inequalities such as $$v_{min}^{(m)} \le v \le v_{max}^{(m)}, \mathcal{D}(p, O) \ge d_{min}^{(m)}, \tag{4b}$$

$$\omega_{min}^{(m)} \le \mathcal{M}(\Psi^r)(p-r) \le \omega_{max}^{(m)}$$

$\mathcal{M}(\psi^r)(p-r)$ extracts a lateral distance with respect to a road heading $\psi^r$ at a reference point r, $\mathcal{D}$ is a distance function, or an under-approximation of it, $O$ is the closest obstacle position, and for the nominal movement m=0.

Determination of Scenarios and Faults

Even when the ego vehicle 111 is operating under the nominal driving conditions, the faults may occur in the incoming future. Hence, the fault selector 303 determines faults that may occur, based on the current state of the ego vehicle 111 and the current state of the environment. Such faults determine a risk zone, which the ego vehicle 111 must avoid in the presence of the fault, and the traffic and vehicle rules that must still be enforced in the presence of the fault. Thus, the fault selector constructs a risk zone to be avoided in form of (exclusion) constraint $$p \notin A^{(m)} \tag{5a}$$

and the vehicle and traffic rules to be enforced in form of (inclusion) constraints, $$\left(x^{(m)}, u^{(m)}\right) \in V^{(m)} \tag{5b}$$

$$\left(x^{(m)}, u^{(m)}\right) \in T^{(m)} \tag{5c}$$

respectively, where $x^{(m)}$, $u^{(m)}$ are respectively a state vector and an input vector of the vehicle model used for fault m=1, . . . . M, which may be different from $x^{(0)}$, $u^{(0)}$ Construction of Evasive Maneuvers and Safe Regions of the Evasive Maneuvers The evasive maneuvers may be computed based on a model different from the motion model of the ego vehicle 111 under the nominal driving condition (1), because the evasive maneuvers may need to be more precise, e.g., using dynamic vehicle motion models rather than kinematic vehicle motion models. Further, to compensate for increased complexity of computations due to the precise models, some motions can be also restricted, e.g., swerving only at constant speed, or braking only with straight steering. For instance, instead of the kinematic bicycle model, the control system 101 may use a dynamic linear-tire-force bicycle model $$\ddot{y}e = -\frac{C_f + C_r}{mv_x}\dot{y}^e + \frac{C_f + C_r}{m}\Psi^e +$$

$$\frac{-C_f l_f + C_r l_v}{mv_x}\Psi^e + \frac{C_f}{m}\delta - \left(\frac{C_f l_f - C_r l_v}{mv_x} + v_x\right)\dot{\psi}^r$$

$$\ddot{\psi}^e = -\frac{C_f l_f - C_r l_v}{mv_x}\dot{y}^e + \frac{C_f l_f + C_r l_v}{I_z}\Psi^e -$$

$$\frac{C_f l_f^2 + C_r l_v^2}{I_z v_x}\Psi^e + \frac{C_f l_f}{I_z}\delta - \frac{C_f l_f^2 + C_r l_v^2}{I_z v_x}\dot{\psi}^r$$

$$\dot{v}_x = 0$$

$$\dot{d} = v_x$$

as motion model (1), where $y^e$ is a lateral error with respect to road center lane, $y^e$ is a heading error with respect to road direction, $\dot{\psi}^r = v_x^2/R^r$ is a desired yaw rate, $R^r$ is a turn radius, $C_f$, $C_r$ are total front and rear cornering stiffnesses, $v_x$ is a longitudinal velocity, d is a distance along the road, m is a vehicle mass, $I_z$ is a moment of inertia along vertical axes, and $l_f$, $l_r$ are front and rear axle distances from a center of mass.

Thus, in constructing the evasive maneuvers, the control system 101 uses the motion model for the ego vehicle 111 in evasive maneuver m $$x_{t+1}^{(m)} = f^{(m)}\left(x_t^{(m)}, u_t\right) \tag{6a}$$

$$p_t^{(m)} = h^{(m)}\left(x_t^{(m)}\right)$$

where $f^{(m)}$ is the state update function of the motion model for the ego vehicle 111 in the evasive maneuver m and $h^{(m)}$ is an output function that returns a position from the ego vehicle state for the evasive maneuver m. For reducing computation, the motion model for the evasive maneuver m is described as a linear dynamical system $$x_{t+1}^{(m)} = A^{(m)}x_t^{(m)} + B^{(m)}u_t \tag{6b}$$

$$p_t^{(m)} = C^{(m)}x_t^{(m)}$$

In order to execute rapid decision of the evasive maneuver, the control system 101 pre-parametrize the evasive maneuver as obtained from a function-based control law, parametrized by a reference parameter (also referred to as control parameter)

$$u = \kappa^{(m)}\left(x^{(m)}, v^{(m)}\right) \tag{7a}$$

where $\kappa^{(m)}$ is a control law function evaluated by the evasive maneuver m and $u^{(m)}$ is the reference parameter of the evasive maneuver m. In some embodiments, for reducing computational effort, the control system 101 uses for (7) a linear controller $$\kappa^{(m)}\left(x^{(m)}, v^{(m)}\right) = K^{(m)}x^{(m)} + G^{(m)}v^{(m)} \tag{7b}$$

The control system 101 uses the control law function (7a) applied to (6a) to plan the evasive maneuver m which results into $$x_{t+1}^{(m)} = f^{(m)}\left(x_t^{(m)}, \kappa^{(m)}\left(x_t^{(m)}, v^{(m)}\right)\right) = f_\kappa^{(m)}\left(x_t^{(m)}, v^{(m)}\right) \tag{8}$$

$$p_t^{(m)} = h^{(m)}\left(x_t^{(m)}\right)$$

where the control system 101 keeps a constant, i.e., fixed, value of the parameter $u^{(m)}$ along the entire evasive maneuver, so that the entire evasive maneuver is determined uniquely by selecting only the value of $u^{(m)}$, which results in the evasive maneuver be rapid to compute.

Given a state x of ego vehicle motion at time $T_{init}$ for the evasive maneuver m where the evasive maneuver is engaged, and a value of the parameter $u^{(m)}$ the evasive maneuver along a future time period of $T_{safe}$, the control system 101 determines that the evasive maneuver m succeeds if the traffic and vehicle constraints (5b), (5c) and avoidance constraint of the risk zone (5a) are all satisfied for the time interval between and $T_{init}$ and $T_{end}=T_{init}+T_{safe}$ by the motion of the ego vehicle 111 generated according to (8). Hence, the control system 101 can scan all possible values of $u^{(m)}$ and for each use simulate (8) and thus determine the values of the parameter $u^{(m)}$, if any, that satisfy (5a), (5b), (5c).

However, such an approach requires extensive simulation and hence significant time. Also, it is not possible to use such an approach for ensuring that a nominal trajectory for the nominal movement remains in a region where the evasive maneuver succeeds. Instead, the control system 101 computes an entire region of states and control parameters for which the evasive maneuver succeeds beforehand, so that simulations during the determination of the evasive maneuver are not needed, and the nominal trajectory can be constrained to remain into such region, so that if the fault occurs, the evasive maneuver is successful. To that end, the control system 101 constructs a safe region for the evasive maneuver m as a subset of intersection of a first region where, the risk zone will be avoided for the future time period $T_{safe}$, and a second region, where the traffic rules and the constraints will be satisfied for the future time period $T_{safe}$, $$\mathcal{R}^{(m)} \subseteq \mathcal{F}^{(m)} \cap \mathcal{S}^{(m)} \tag{9}$$

FIG. 5A shows a block diagram for determining the safe region, according to some embedment of the present disclose. The safe region corresponds to the region of the state of the ego-vehicle 111 that allows the evasive maneuver to succeed in the case when the fault is detected. At block 501, the processor 101 computes regions $\mathcal{W}_k^{(m)}$ where the evasive maneuver is within the risk zone at a future time instant k, for k between 0 and T$_{safe}$.

At block 503, the processor 103 computes a union 602 of the computed regions $\mathcal{W}_k^{(m)}$. At block 505, the processor 101 computes a complement of the union of computed regions $\mathcal{W}_k^{(m)}$, $$\mathcal{F}^{(m)} = \left( \bigcup_{k=0}^{T_{safe}} W_k^{(m)} \right)^c. \tag{10}$$

The region $\mathcal{W}_k^{(m)}$ is computed iteratively as $$W_0^{(m)} = \left\{ (x, v^{(m)}): p \in \mathcal{A}^{(m)} \right\} \tag{11}$$

$$W_k^{(m)} = Pre_{f_k^{(m)}}\left( W_{k-1}^{(m)} \right)$$

and Pre denotes a predecessor set operator, $Pre_f(\mathcal{X})=\{x: f(x)\in \mathcal{X}\}$. The c complement of the regions $\mathcal{W}_k^{(m)}$ is referred to the first region.

For computing the second region, at block 507, the processor 103 computes a region where the traffic rules and the constraints are satisfied $$S^{(m)} = \{ (x^{(m)}, v^{(m)}): (5a), (5b), (5c) \text{ for } t \in [0, T_{safe}], \tag{12}$$

$$x_0 = x_{T_{safe}}, x_{t+1}^{(m)} = f_{\mathcal{K}}^{(m)}\left( x_t^{(m)}, v^{(m)} \right), p_t^{(m)} = h^{(m)}\left( x_t^{(m)} \right) \}$$

By Computing Iteration $$\mathcal{X}_0^{(m)} = \left\{ (x, v^{(m)}): (x, v^{(m)}) \in V^{(m)}, (x, v^{(m)}) \in \mathcal{T}^{(m)} \right\} \mathcal{X}_k^{(m)} = \tag{13}$$

$$Pre_{f_k^{(m)}}\left( \mathcal{X}_{k-1}^{(m)} \right) \cap \mathcal{T}^{(m)} \cap V^{(m)}$$

$$S^{(m)} = \mathcal{X}_{T_{safe}}^{(m)}$$

At block 509, the processor 101 the safe region $\mathcal{R}^{(m)}$ based on the complement of the union of the computed regions (i.e., the first region), and the region where the constraints and the traffic rules are satisfied (i.e., the second region).

Some embodiments are based on the realization that, in order to reduce future computations for improving the evasive maneuver response time and the nominal trajectory computation time, the safe region $\mathcal{R}^{(m)}$ can computed as a proper subset $\mathcal{R}^{(m)} \subseteq \mathcal{F}^{(m)} \cap S^{(m)}$, and specifically, a proper convex subset. To that end, some embodiments compute the safe region as a convex safe region.

Figure 5B:
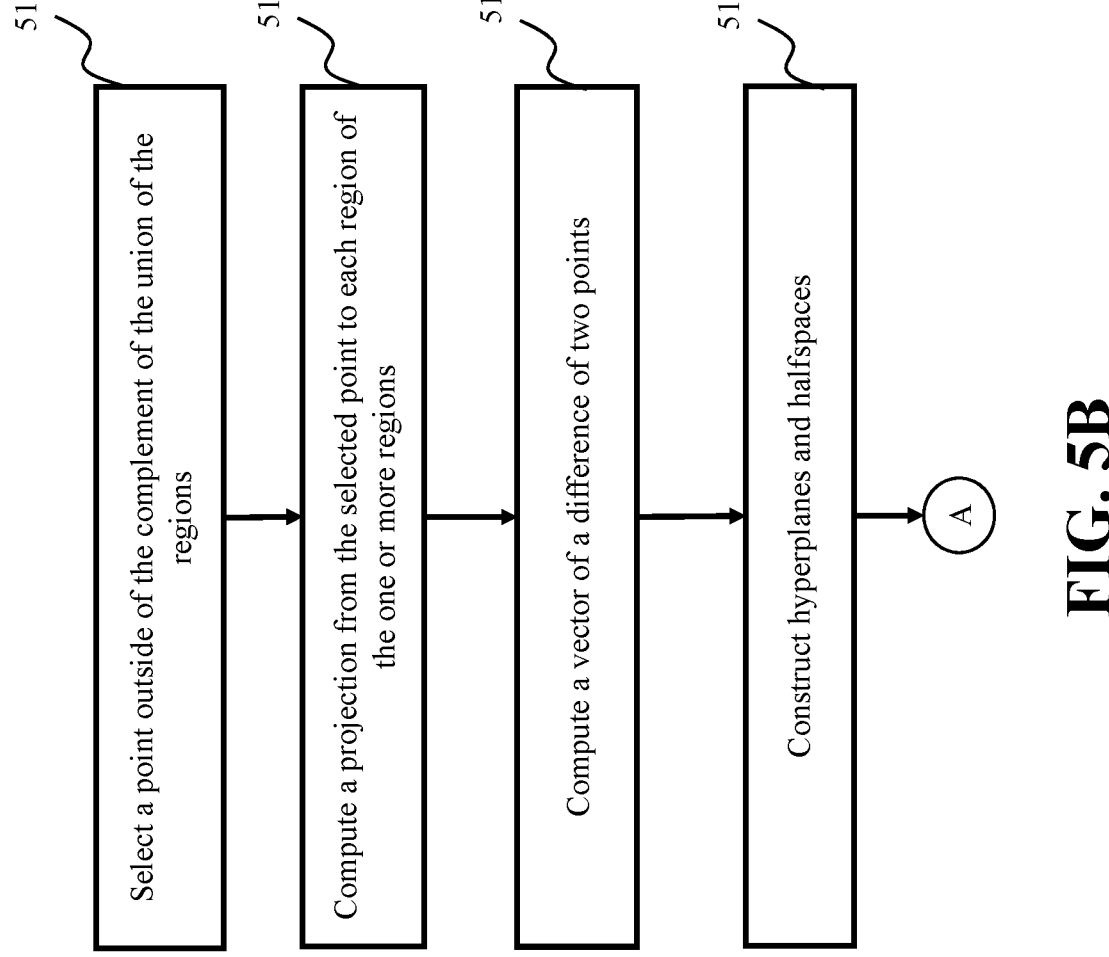
FIG. 5B shows a block diagram for computing the safe region as a convex safe region, according to some embodiments of the present disclosure.
Figure 5B:
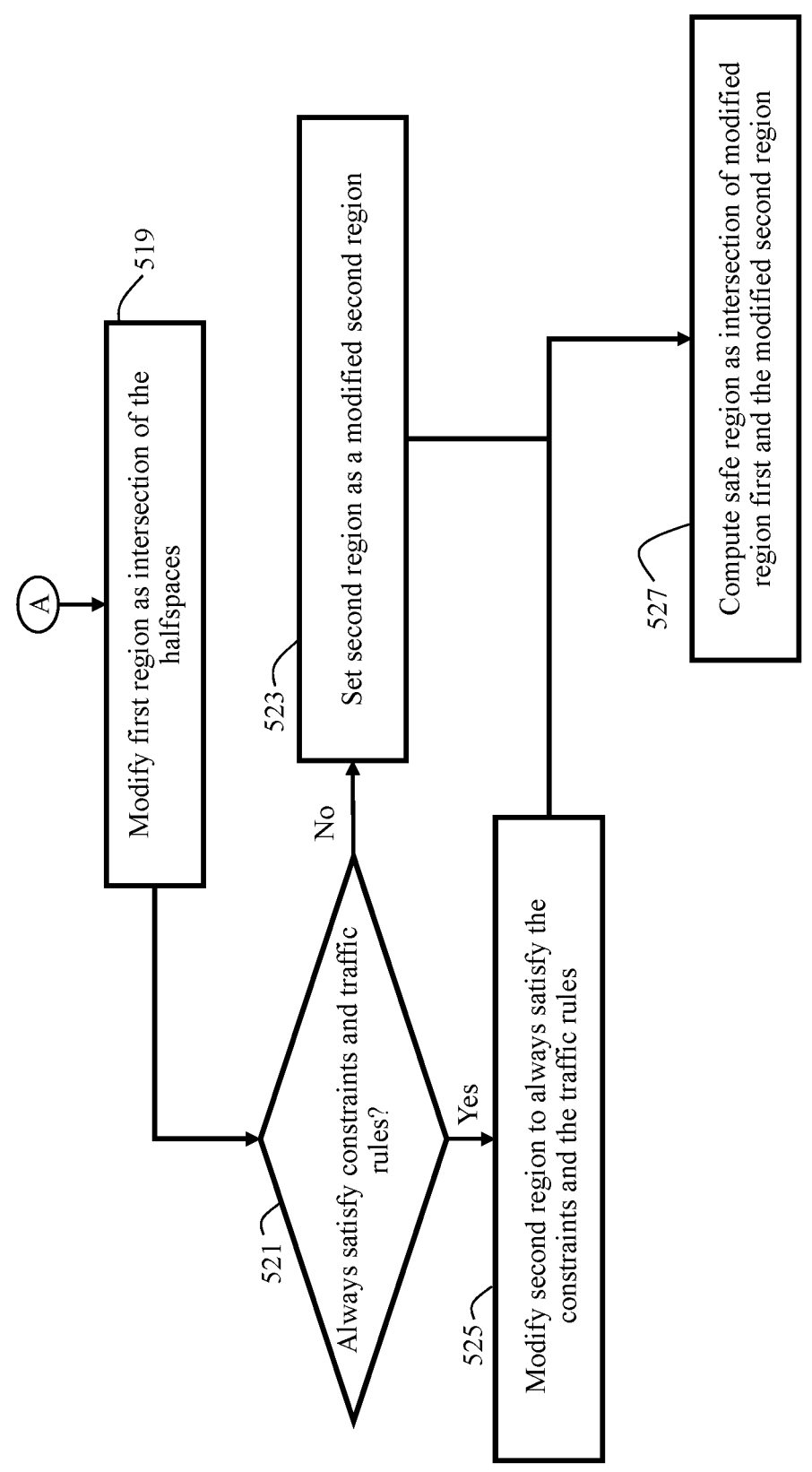

FIG. 5B shows a block diagram for computing the safe region as the convex safe region, according to some embodiments of the present disclosure. At block 511, the processor 101 selects a point $\xi$ outside of the complement of the union of computed regions ($\bigcup_{k=0}^{T_{safe}} \mathcal{W}_k^{(m)}$). At block 513, the processor 101 computes a projection from the selected point outside $\mathcal{F}^{(m)^c}$ to the regions $\mathcal{W}_k^{(m)}$. At block 515, the processor 101 computes a vector of a difference $\Gamma_k^{(m)}$ of the selected point outside $\mathcal{F}^{(m)^c}$ and the projection of such point on the regions $\mathcal{W}_k^{(m)}$.

At block 517, the processor 101 uses the vector of the difference of the two points to construct a hyperplane, $\Gamma_k^{(m)}\xi=\gamma_k^{(m)}$, which separates the region $\mathcal{W}_k^{(m)}$ from the point $\xi$. Then, the processor 101 constructs a halfspace $\Gamma_k^{(m)}\xi\leq\gamma_k^{(m)}$ from such hyperplanes that include the point. At block 519, the processor 101 intersects all such hyperplanes to obtain $\Gamma_k^{(m)}\xi\leq\gamma^{(m)}-\varepsilon$ and to modify the first region as intersection of the halfspaces $R^{(m)}=\{\Gamma^{(m)}\xi\leq\gamma^{(m)}-\varepsilon\}\cap S^{(m)} \subset \mathcal{F}^{(m)} \cap S^{(m)}$.

Further, the control system 101 can over-constrain the second region $S^{(m)}$ by computing it in such a way that for points within $S^{(m)}$ the evasive maneuver satisfies the constraints and the traffic rules for all future instants, not just in the future time period of length T$_{safe}$. At block 521, the processor 101 checks if satisfaction of the constraints and the traffic rules for all future instants is requested. If not requested, then, at block 523, the processor 101 sets the second region to be a modified second region. If satisfaction of the constraints and the traffic rules for all future instants is requested, then, at block 525, the processor 101 modifies the second region to always satisfy the constraints and the traffic rules by performing the iteration (13) until convergence, i.e., until $\mathcal{X}_k^{(m)} = \mathcal{X}_{k-1}^{(m)} = S^{(m)}$. Further, at block 527, the processor 101 computes the safe region as an intersection of the modified first region and the modified second region.

Computation of Nominal Trajectory and Parameter

For the evasive maneuvers to be successful in the presence of the faults, it is necessary that they are initiated in the safe region. Thus, the control system 101 must ensure that the nominal trajectory of the ego vehicle 111 stays in the safe regions at all time, until a fault occurs. For the evasive maneuver m selected by the fault selector 303, the control system 101 imposes that any predicted vehicle state $x_{k|t}^{(0)}$ along the nominal trajectory must satisfy the constraint that there exists an m evasive maneuver parameter value $v_{k|t}^{(m)}$ such that $$\left( x_{k|t}^{(0)}, v_{k|t}^{(m)} \right) \in \mathcal{R}_{k|t}^{(m)} \tag{14}$$

where $\mathcal{R}_{k|t}^{(m)}$ is a predicted safe region of the evasive maneuver m at k time steps ahead of initial planning time t, and $\mathcal{R}_{0|t}^{(m)}$ is the current safe region, i.e., the safe region at current time. Imposing such constraints on the nominal trajectory ensures that if the fault occur at any point of the nominal trajectory, the control system 101 can compute a parameter value for the evasive maneuver m which results in successful execution of the evasive maneuver, and hence the risk zone is avoided, and the vehicle rules and traffic rules, other than lesser importance rules for the current states of the ego vehicle 111 and the environment, are satisfied.

In certain embodiments, the control system 101 computes an optimal control over a future prediction horizon to determine the nominal trajectory and nominal control command and the parameter for the evasive maneuver to succeed, should the fault occur along the prediction horizon of the optimal control problem. The region of the state of the ego vehicle 111 uplifted with admissible values of the control parameter is enforced as a constraint in the optimal control. The optimal control has an associated optimization problem that is solved numerically. Thus, the optimization includes the constraints (14) to ensure that the nominal trajectory remains within the safe region. The optimization problem is given as $$\min_{U_t, \gamma_t} F(x_{N_P|t}^{(0)}, r_{N_p|t}^{(0)}) + \sum_{k=0}^{N_p-1} \left( L(x_{k|t}^{(0)}, u_{k|t}, r_{k|t}^{(0)} \sum_{m \in \mathcal{M}_t} L_v^{(m)}(v_{k|t}^{(m)}) \right) \tag{15a}$$

$$\text{s.t. } x_{k+1|t}^{(0)} = f^{(0)}(x_{k|t}^{(0)}, u_{k|t}) \ (x_{k|t}^{(0)}, u_{k|t}) \in V^{(0)} \cap \mathcal{T}^{(0)}$$

$$x_{k|t}^{(m)} = \psi^{(m)}(x_{k|t}^{(0)}, u_{k|t}, r_{k|t}^{(0)}), (x_{k|t}^{(m)}, v_{k|t}^{(m)}) \in \mathcal{R}_{k|t}^{(m)}, \forall m \in \mathcal{M}_t$$

$$x_{0|t}^{(0)} = x(t),$$

where $N_p$ is a prediction horizon, F and L are a terminal and stage cost for the nominal trajectory, $L_u^{(m)}$, is a cost of choosing a certain value for the parameter of the evasive maneuver m, $U_t = (u_{0|t} \ldots u_{N_{p|t}})$, is the sequence of control inputs for nominal driving along the prediction horizon, $$\Upsilon_t = \left\{ (v_{0|k}^{(m)} \ldots v_{N_p|t}^{(m)}) \right\}_{m \in \mathcal{M}_t}$$ are the control parameters for the evasive maneuver, one for each maneuver m when such maneuver is initiated at a time k along the prediction horizon, $\mathcal{M}_t$ is a set of faults selected by the fault selector 303, and $r_{k|t}^{(0)}$ includes information about desired behavior of the nominal trajectory k time steps ahead of initial planning time t.

The control system 101 computes a solution of optimization problem (15a), $$U^*_t = (u^*_{0|k} \ldots u^*_{N_p|T}) \text{ and} = \{$$

$$\Upsilon_t^* = (v_{0|k}^{(m),*} \ldots v_{N_p|t}^{(m),*}) \}_{m \in \mathcal{M}_t}.$$

From the solution of (15a) the control system 101 can compute the next nominal control command for the nominal trajectory 411 as $$\kappa^{(0)}\left(x_t, \{r_{k|t}^{(0)}\} \frac{N}{k=0}\right) = u^*_{0|t} \tag{16a}$$

and, if a fault has occurred, the next evasive control command for the evasive maneuver as $$\kappa^{(m)}(x_t, \{v_{0|t}^{(m),*}\}), \forall m \in \mathcal{M}_t \tag{16b}$$

For the case where the evasive maneuvers are defined by the linear control law (7b), computation of (16b) amounts to simply evaluating linear expression, which is an example of a reactive feedback control, $$\kappa^{(m)}(x_t, \{v_{0|t}^{(m),*}\}) = K^{(m)}x_t^{(m)} + G^{(m)}v_{0|t}^{(m),*}, \forall m \in \mathcal{M}_t \tag{17}$$

In some embodiments, the control system 101 computes all future commands along the prediction horizon $N_p$, by substituting subscript t and $0|t$ with $k|t$ in (16a), (16b). Similarly, the control system 101 can compute a sequence of multiple commands of the evasive maneuvers by using (16a) as (7a) into (8). For the case where the nominal model of vehicle motion is linear, the constraints are linear and evasive maneuver model of motions are linear, and cost function of (15a) is quadratic, and the safe region is taken as a convex subset, the optimization problem (15a) is a quadratic program.

In some embodiments, the fault selector 303 may determine more than one evasive maneuver for a single fault. In such a case the optimization problem (15a) is modified into $$\min_{U_t, \gamma_t, \Delta_t} F(x_{N_P|t}^{(0)}, r_{N_p|t}^{(0)}) + \sum_{k=0}^{N_p-1} \left( L(x_{k|t}^{(0)}, u_{k|t}, r_{k|t}^{(0)} \sum_{m \in \mathcal{M}_t} L_v^{(m)}(v_{k|t}^{(m)}) \right) \tag{15b}$$

$$\text{s.t. } x_{k+1|t}^{(0)} = f^{(0)}(x_{k|t}^{(0)}, u_{k|t}) \ (x_{k|t}^{(0)}, u_{k|t}) \in V^{(0)} \cap \mathcal{T}^{(0)}$$

$$x_{k|t}^{(m)} = \psi^{(m)}(x_{k|t}^{(0)}, u_{k|t}, r_{k|t}^{(0)}), (x_{k|t}^{(m)}, v_{k|t}^{(m)}) \in \mathcal{R}_{k|t}^{(m)}, \text{ if } \delta_{k|t}^{(m)} = 1$$

$$\sum_{m \in \mathcal{M}_t} \delta_{k|t}^{(m)} = 1$$

$$x_{0|t}^{(0)} = x(t),$$

where there are additional binary decision variables $\Delta_t = \{ \delta_{k|t}^{(m)} \}_{k \in [o, N-1], m \in \mathcal{M}_t}$ which, for each fault, select the safe region m, and hence the evasive maneuver m, to be attained, among all the allowed ones $\mathcal{M}_t^\mu$ for such fault where $\cup \mathcal{M}_t^\mu = \mathcal{M}_t$ is an entire set of the evasive maneuvers. Optimization problem (15b) is transformed into a mixed integer linear/nonlinear program, for instance, by means of big-M techniques. In such a case, set-based constraint $(x_{k|t}^{(m)}, v_{k|t}^{(m)}) \in \mathcal{R}_{k|t}^{(m)}$ is re-formulated as a function-based constraint $\mathbb{H}_{k|t}^{(m)}(x_{k|t}^{(m)}, v_{k|t}^{(m)}) \leq 0^{(m)}$ and dependency on the binary decision variable that select which constraints are satisfied is obtained by modifying such constraint into $\mathbb{H}_{k|t}^{(m)}(x_{k|t}^{(m)}, v_{k|t}^{(m)}) - \delta_{k|t}^{(m)} \mathbb{M} \leq 0^{(m)}$, where $\mathbb{M}$ is a positive number larger than the maximal value of k t $\mathbb{H}_{k|t}^{(m)}(x_{k|t}^{(m)}, v_{k|t}^{(m)})$. From solution of (15b) only a single evasive maneuver m from within a group associated to a fault $\mathcal{M}_t^\mu$ has an associated variable $\delta_{k|t}^{(m)}$ with value 1, and that is the one to be used if such fault occurs.

Determination of Control Command for the Ego Vehicle

Figure 6:
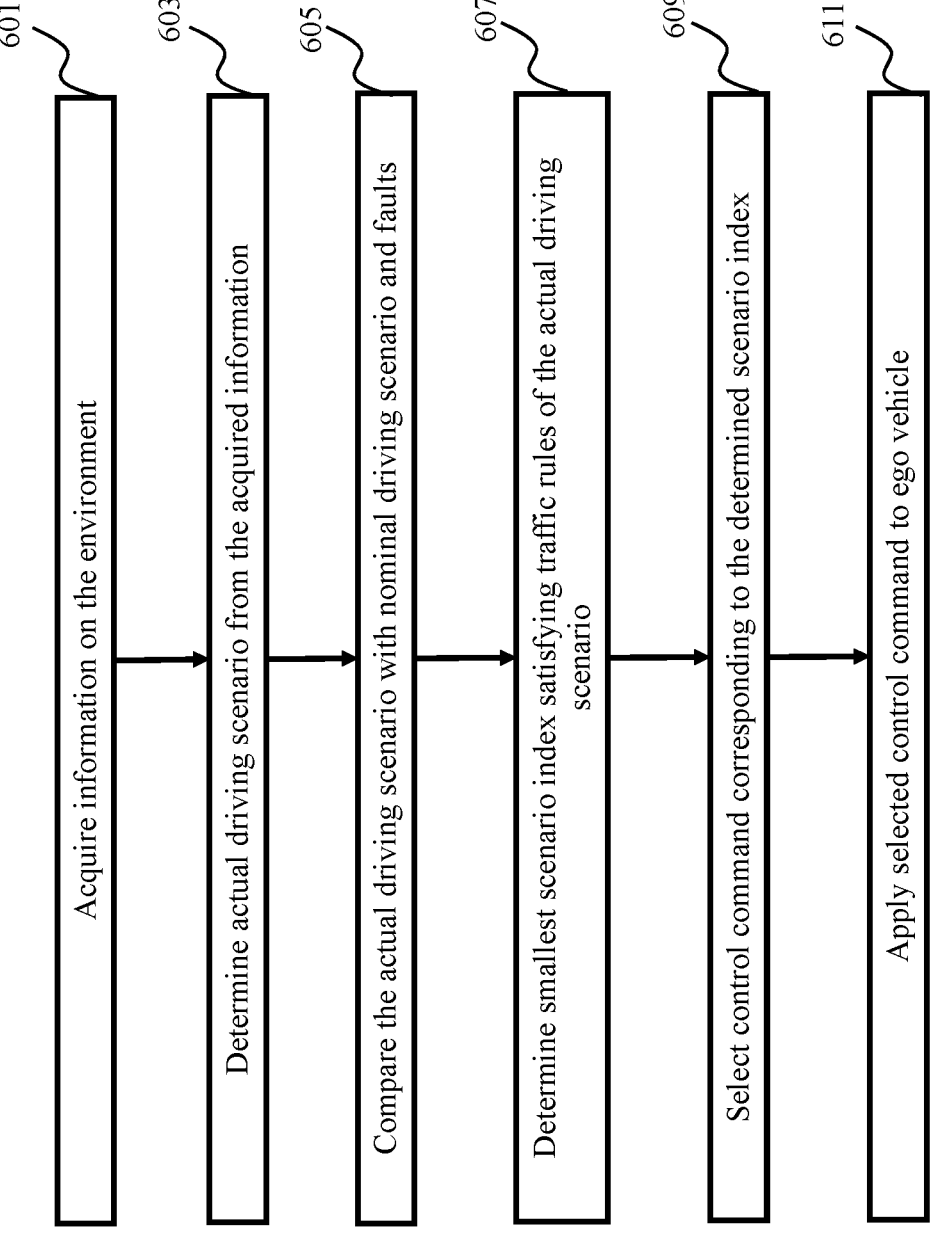
FIG. 6 shows a block diagram for determining a control command for the ego vehicle, according to some embodiments of the present disclosure.

FIG. 6 shows a block diagram for determining the control command for the ego vehicle 111, according to some embodiments of the present disclosure. At block 601, the processor 103 acquires information on the environment from the sensors associated with the ego vehicle 111. At block 603, the processor 103 determines an actual driving scenario from the acquired information. For instance, the processor 103 determines actual traffic rules $\mathcal{T}_t^{(actual)}$ based on the acquired information on the environment.

At block 605, the processor 103 compares the actual driving scenario with nominal driving scenario and the faults (or fault scenarios) determined by the fault selector 303. to evaluate in which scenario the ego vehicle 111 is currently operating, whether the nominal driving scenario or in a specific failure scenario. For instance, the processor 103 compares the actual traffic rules $\mathcal{T}_t^{(actual)}$ with traffic rules for the nominal driving scenario and the faults selected by the fault selector 303, $\mathcal{T}_t^{(m)}$, m∈ $\mathcal{M}_t \cup \{0\}$. At block 607, the processor 103 determines the smallest scenario index satisfying traffic rules of the actual driving scenario, m*∈ $\mathcal{M}_t \cup \{0\}$ between such that $\mathcal{T}_t^{(actual)} \subseteq \mathcal{T}_t^{(m^*)}$. Thus, if the actual traffic rules satisfy the traffic rules for the nominal driving scenario, the nominal driving scenario m*=0 chosen.

At block 609, the processor 103 selects control command corresponding to the determined scenario index, m*∈ $\mathcal{M}_t \cup \{0\}$, $$\kappa^{(0)}\left(x_t, \{r_{k|t}^{(0)}\}\frac{N}{k=0}\right) = u_{0|t}^{(0)} \text{ if } m^* = 0, \tag{18}$$

$$\kappa^{(m)}\left(x_t, v_{0|t}^{(m),*}\right) \text{ if } m \in \mathcal{M}_t$$

that is, a control command for the nominal driving is selected if the scenario index indicates the nominal driving scenario, m*=0, while a control command for the corresponding evasive maneuver is chosen, if the scenario index indicates a fault m∈ $\mathcal{M}_t$. At block 611, the processor 103 applies the selected control command to the ego vehicle 11, which modifies its motion accordingly.

In some embodiments, the control system 101 solves problem (15a) as a nonlinear, non-convex optimal control problem. In some embodiments, the motion model under the nominal driving conditions (1) and the evasive maneuvers (6a), and maneuver controllers (7) are linear dynamical models, similar to (6b) and (7b), the constraints are linear inequalities, and the cost function in (15a) is a quadratic positive definite function, the control system 101 transforms problem (15a) into a linearly constrained convex quadratic program $$\min_{\varsigma} \varsigma' Q_\varsigma \varsigma + F_\varsigma \varsigma \tag{19a}$$

$$\text{s.t., } H_\varsigma \varsigma \le K_\varsigma$$

$$S_\varsigma \varsigma \in \{0,1\}$$

where $Q_\varsigma$, $F_\varsigma$, $H_\varsigma$, $K_\varsigma$ are obtained from (15a), which is solved by optimality by a specific algorithm, such as projected gradient, Alternating Direction Method of Multipliers (ADMM), active set method, or interior point method. The solution of (15a) is reconstructed from the solution ç* of (19a) by $$\begin{bmatrix} U_t^* \\ \gamma_t^* \end{bmatrix} = \mathbb{M}_\varsigma \varsigma^*$$

where $\mathbb{M}_\varsigma$ is a selector matrix, i.e., a matrix composed of 1 and 0 that selects components of right hand side to assign them to components of left hand side.

In some embodiments, multiple evasive maneuvers are possible for a single fault, and the motion model under the nominal driving conditions (1), i.e., the nominal model of vehicle motion, and the evasive maneuvers (6a), and maneuver controllers (7) are linear dynamical models, similar to (6b) and (7b), the constraints are linear inequalities, the cost function in (15b) is a quadratic positive definite function, the control system 101 transforms problem (15b) into a mixed integer quadratic program $$\min_{\varsigma} \varsigma' Q_\varsigma \varsigma + F_\varsigma \varsigma \tag{19b}$$

$$\text{s.t., } H_\varsigma \varsigma \le K_\varsigma$$

$$S_\varsigma \varsigma \in \{0,1\}$$

where $Q_\varsigma$, $F_\varsigma$, $H_\varsigma$, $K_\varsigma$, $S_\varsigma$ are obtained from (15b), where XX is a matrix that selects the variables that are integer, and specifically in (19b) Boolean. Optimization problem (19b) is solved by optimality by a specific algorithm that first determine a number of convex relaxations being convex quadratic programs subject to linear constraints, such as by branch and bound or branch and cut, and then solves such convex relaxations with the same methods of (19a) such as projected gradient, ADMM, active set method, or interior point method. The solution of (15b) is reconstructed from the solution ç* of (19b) by $$\begin{bmatrix} U_t^* \\ \gamma_t^* \\ \Delta_t^* \end{bmatrix} = \mathbb{T}_\varsigma \varsigma^*$$

where $\mathbb{T}_\varsigma$ is a selector matrix, i.e., a matrix composed of 1 and 0 that selects components of right hand side to assign them to components of left hand side, and $\Delta_t$ is the vector containing the auxiliary integer variables $\delta_{k|t}^{(m)}$.

In some embodiments, the prediction of the risk zone $\mathcal{R}_{k|t}$ in (15) is entirely provided. In some other embodiments, motion of the risk zone is predicted according to a motion model $$\omega_{t+1} = f_\omega(\omega_t)$$

$$p_t^\omega = h_\omega(\omega_t)$$

that predicts the motion of a specific point $p_t^\omega$ of the risk zone, and the whole risk zone is predicted as a region of constant size, around that point, that hence moves with such point $\mathcal{R}_t = p_t^\omega \oplus \mathcal{R}^{ra}$, where $\oplus$ denotes set sum.

In some embodiments, the control system 101 computes the safe regions for the evasive maneuvers at each control cycle. In some other embodiments, the control system 101 computes the safe region of the evasive maneuver based on a relative motion model of the ego vehicle 111 with respect to the risk zone, $$x_{r,t+1}^{(m)} = f_r^{(m)}\left(x_{r,t}^{(m)}, \kappa_r^{(m)}\left(x_{r,t}^{(m)}, v_r^{(m)}\right)\right) = f_{r,\kappa}^{(m)}\left(x_{r,t}^{(m)}, v_r^{(m)}\right)$$

$$p_{r,t}^{(m)} = h_{r,t}^{(m)}\left(x_{r,t}^{(m)}\right)$$

obtained by centering origin in a reference point $p_t^\omega$ of the risk zone, and representing coordinate of the motion of the ego vehicle 111 within such point, and then representing a relative motion of the ego vehicle 111 with respect to such point. Using the relative motion, at each step the control system 101 converts information from global coordinates to relative coordinates with respect to the point $p_t^{\omega}$ of the risk zone, computes control commands of the ego vehicle 111 in such relative coordinates, and then transforms the control command back from the relative coordinates to the global coordinates by inverting coordinate transformation. Using the relative motion model, the control system 101 re-computes the safe region of the evasive maneuvers only when the risk zone size changes or the traffic or vehicle rules change.

The functioning of the control system 101 in an autonomous driving scenario is described below in FIG. 7A and FIG. 7B.

Figure 7A:
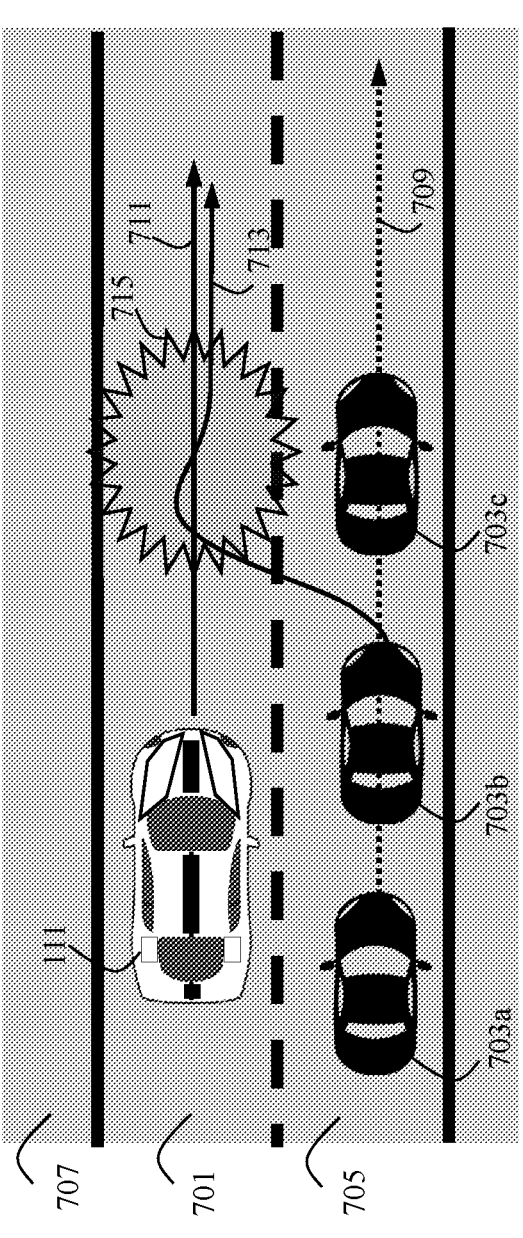
FIG. 7A illustrates an autonomous driving scenario, according to some embodiments of the present disclosure.

FIG. 7A illustrates an autonomous driving scenario 700, according to some embodiments of the present disclosure. The ego vehicle 111 is moving on a road in a left lane 701, while other vehicles, such a vehicle 703a, a vehicle 703b and a vehicle 703c (collectively referred hereinafter as the other vehicles 703a, 703b, and 703c), are moving in a right lane 705. Left road shoulder lane 707 is empty of obstacles. The control system 101 predicts a trajectory 709 of the other vehicles 703a, 703b, and 703c, according to which the other vehicles 703a, 703b, and 703c remain in their current lane 705. Consequently, the control system 101 plans a trajectory 711 that maintains the ego vehicle 111 in the left lane 701. However, the vehicle 703b decides to initiate a lane change maneuver to the left lane 701 according to a trajectory 713 which creates a potential risk of collision in a risk zone 715. In such a scenario, the control system 101 executes an evasive maneuver that avoids the risk zone 715 to avoid collision with the vehicle 703b, as described below in FIG. 7B.

Figure 7B:
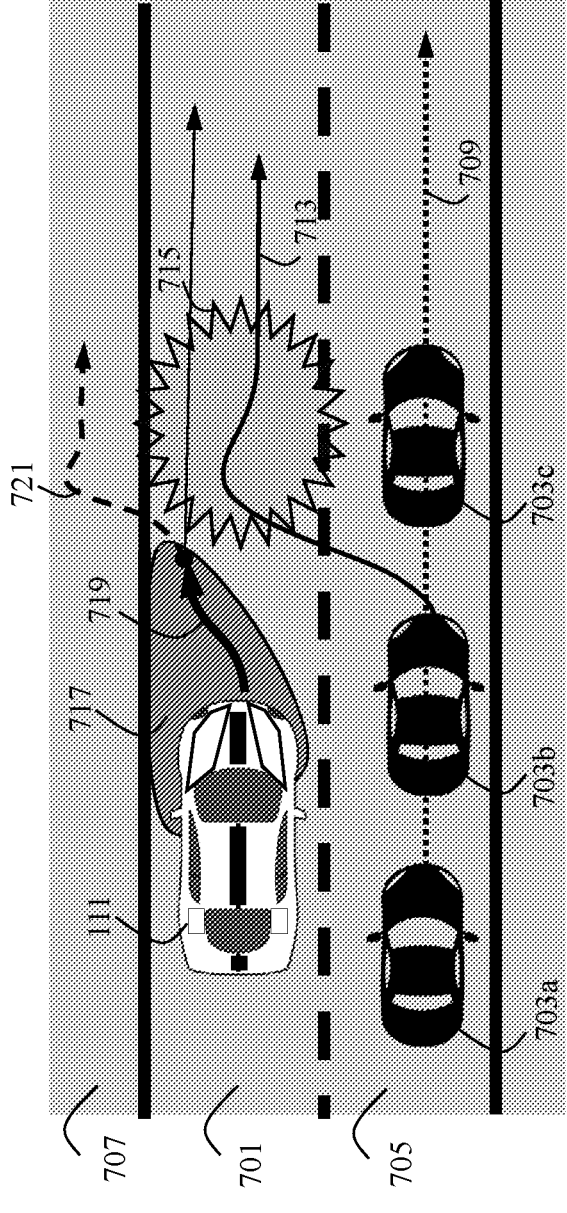
FIG. 7B shows illustrates an evasive maneuver that avoids a risk zone, according to some embodiments of the present disclosure.

FIG. 7B shows illustrates an evasive maneuver that avoids the risk zone 715, according to some embodiments of the present disclosure. The control system 101 receives, from the sensors associated with the ego vehicle 111, a feedback signal indicative of a current state of the ego vehicle 111 and a current state of the environment in which the ego vehicle 111 is moving. The processor 103 processes the feedback signal to determine a region 717 of the state of the ego vehicle 111 uplifted with admissible values of the control parameter. Further, the processor 103 processes the feedback signal with the nominal controller 107 to produce a nominal control command maintaining the state of the ego vehicle 111 within the region 717 of the state of the ego vehicle 111. For instance, the processor 103 determines a nominal trajectory 719 that maintains the ego vehicle 111 within the region 717. Further, the processor 103 evaluates the state function of the evasive controller 109 with a value of the control parameter from the region 717 of the state of the ego vehicle 111 to produce the evasive control command. The evasive control command causes the ego-vehicle 111 to move along an evasive maneuver 721. The evasive maneuver 721 avoids the risk zone 715 by driving on the left road shoulder 707. The evasive maneuver 721 violates a traffic rule of not driving into on the left road shoulder 707, but avoids the risk of collision with the vehicle 703b. Thereby, safety of the passengers of the ego vehicle 111 is ensured.

Since the state of the ego vehicle 111 is maintained with the within the region 717 of the state of the ego vehicle 111 uplifted with admissible values of the control parameter, the control system 101 can evaluate the state function of the evasive controller 109 with a control parameter from the region 717 to produce the evasive control command.

Thereby, the execution of the evasive maneuver is guaranteed when the fault is detected.

Figure 8:
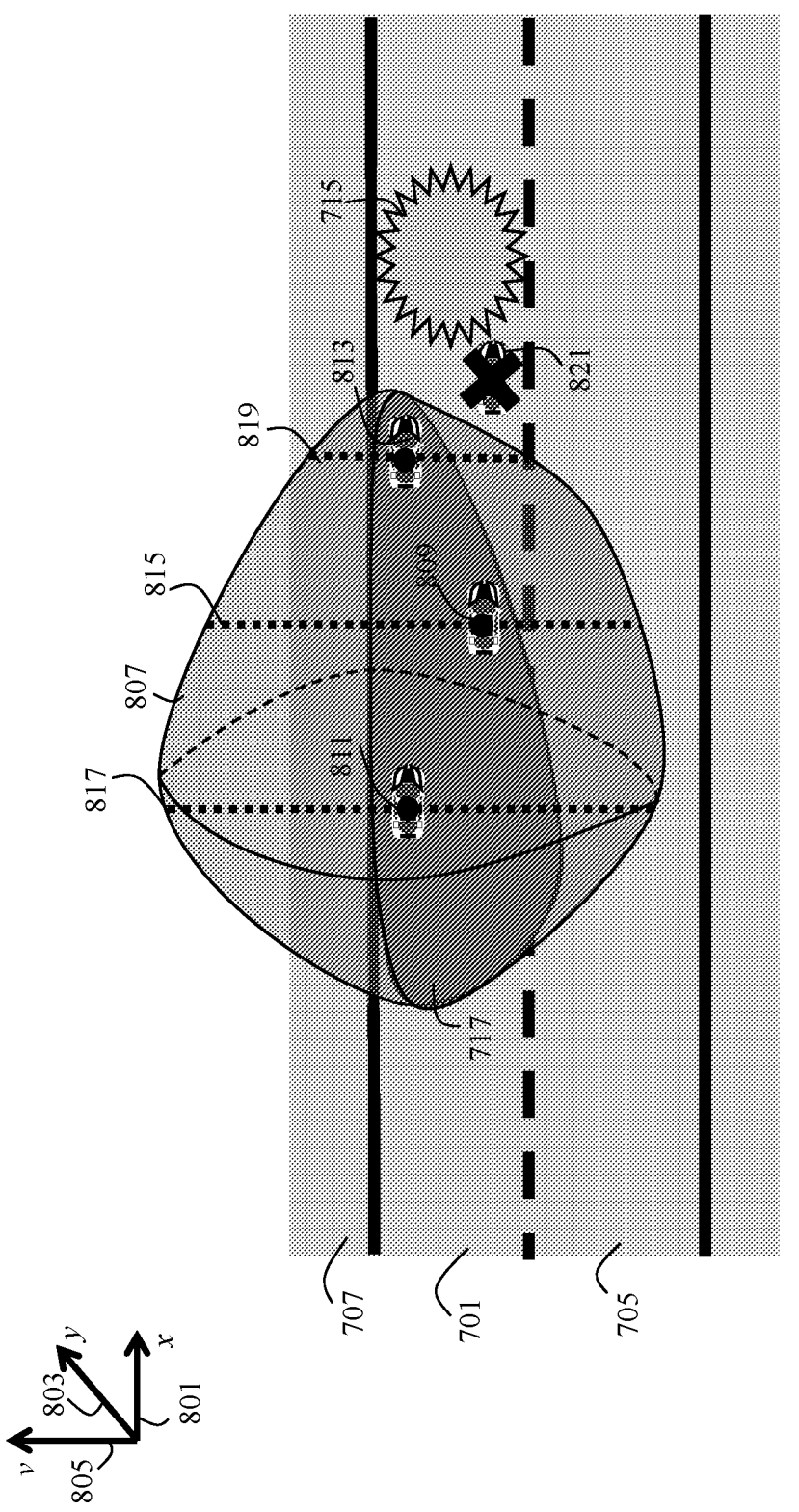
FIG. 8 shows a scenario similar to FIG. 7A, where regions of states of the ego vehicle and controller parameters are shown, according to some embodiments of the present disclosure.

FIG. 8 shows a scenario similar to FIG. 7A, where regions of states of the ego vehicle 111 and the controller parameters are shown, according to some embodiments of the present disclosure. Axes in FIG. 8 include vehicles states of longitudinal 801 and lateral 803 positions, and a control parameter 805. An admissible region 807 determines combinations of the vehicle states and the controller parameters such that if the evasive maneuver is initiated at such state with a control parameter equal to such parameter, the evasive maneuver succeeds in avoiding the risk zone 715 and satisfies the traffic rules and the constraints for the corresponding fault.

Projection of the admissible region 807 onto space of the vehicle states, in FIG. 8 the space spanned by the axes 801 and 803, is the projected region 717 where the ego vehicle 111 can drive under the nominal driving conditions such that if a fault then the control system 101 can find a value of the control parameter such that the evasive maneuver exists. At the same time, if value of the state of the ego vehicle 111 is fixed, corresponding vertical segment included in the admissible region 807 and passing on a point in the projected region 717 corresponding to such vehicle state contains the values of the control parameter of the evasive maneuver such that the evasive maneuver at such vehicle state succeed. For instance, for vehicle positions 809, 811, 813, segments 815, 817, 819, respectively, determines the values for which the evasive maneuver succeed. However, for vehicle position 821, there is no evasive maneuver that succeed, because the vehicle position 821 is outside the projected region 717 and in fact there is no vertical segment passing on the vehicle position 821 that is included in the admissible region 807.

Figure 9:
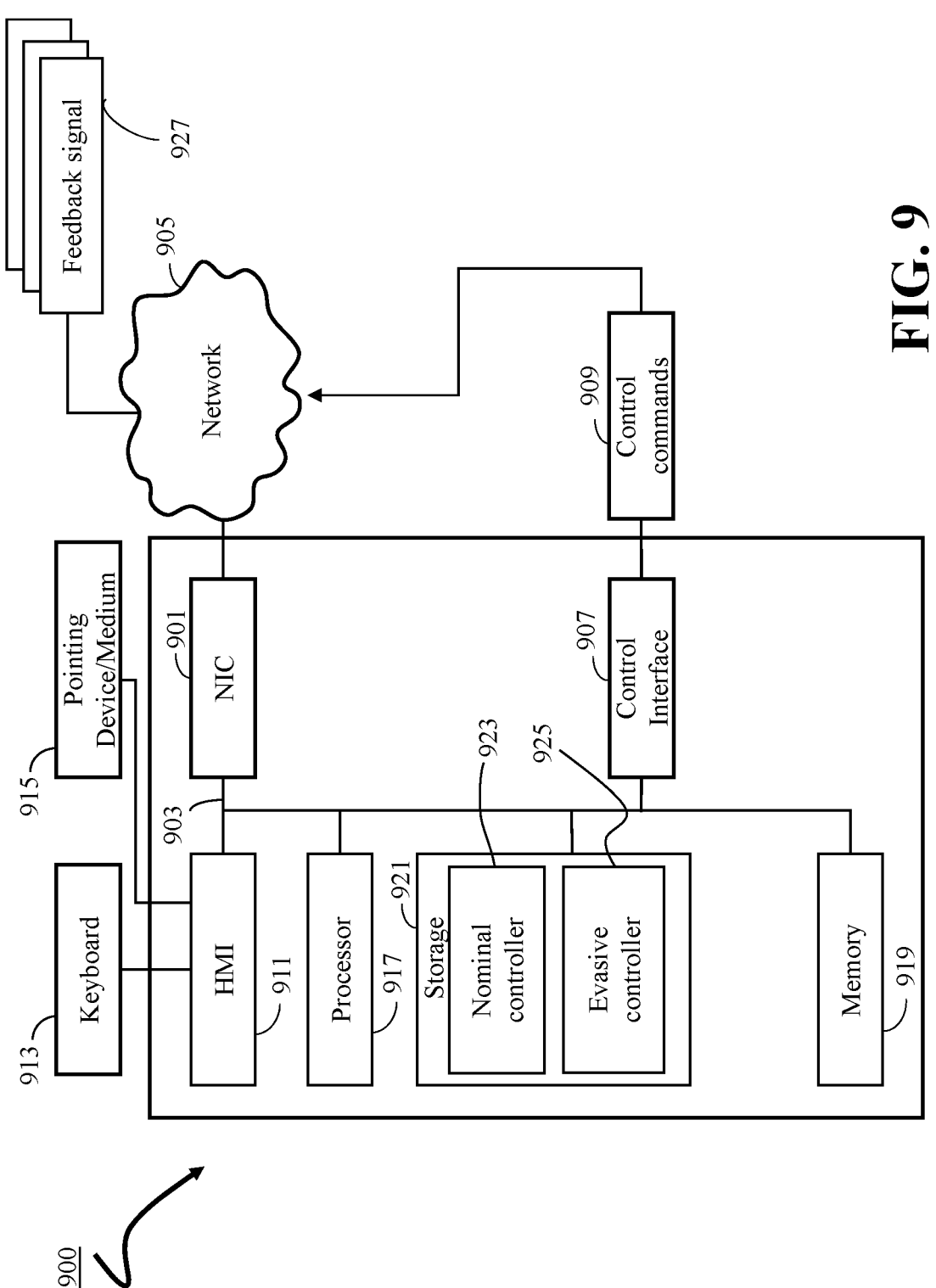
FIG. 9 shows a block diagram of a control system for controlling motion of the ego vehicle, in accordance with some embodiments of the present disclosure.

FIG. 9 shows a block diagram of a control system 900 for controlling motion of an ego vehicle, in accordance with some embodiments. The control system 900 can be arranged on a remote server as part of RSU to control the ego vehicle. The control system 900 can have a number of interfaces connecting the control system 900 with other machines and devices. A network interface controller (NIC) 901 includes a receiver adapted to connect the control system 900 through the bus 903 to a network 905 to receive a feedback signal 927 indicative of a current state of the ego vehicle and a current state of an environment of motion of the ego vehicle.

The NIC 901 also includes a transmitter adapted to transmit the evasive control command or the nominal control command to the ego vehicle via the network 905. To that end, the control system 900 includes an output interface, e.g., a control interface 907, configured to submit control commands 909 to the ego vehicle through the network 905. The control commands include the evasive control commands or the nominal control commands. In such a manner, the control system 900 can be arranged on a remote server in direct or indirect wireless communication with the ego vehicle.

The control system 900 can also include other types of input and output interfaces. For example, the control system 900 can include a human machine interface 911. The human machine interface 911 can connect the control system 900 to a keyboard 913 and a pointing device 915, wherein the pointing device 915 can include a mouse, trackball, touchpad, joystick, pointing stick, stylus, or touchscreen, among others.

The control system 900 includes a processor 917 configured to execute stored instructions, as well as a memory 919 that stores instructions that are executable by the processor.

The processor 917 can be a single core processor, a multi-core processor, a computing cluster, or any number of other configurations. The memory 919 can include random access memory (RAM), read only memory (ROM), flash memory, or any other suitable memory machines. The processor 917 can be connected through the bus 903 to one or more input and output devices.

The processor 917 is operatively connected to a memory storage 921 storing the instruction as well as processing data used by the instructions. The memory storage 921 can form a part of or be operatively connected to the memory 919. For example, the memory storage 921 can be configured to store a nominal controller 923 for controlling a nominal motion of the ego vehicle subject to a nominal constraint and an evasive controller 925 for controlling an evasive maneuver of the ego vehicle subject to an evasive constraint different from the nominal constraint. The nominal controller 923 is configured to produce the nominal control command according to a movement objective of the ego vehicle. The evasive controller 925 is configured to produce the evasive control command by evaluating a state function of a control parameter.

The processor 917 is configured to process the feedback signal to determine a region of the state of the ego vehicle uplifted with admissible values of the control parameter allowing the evasive maneuver to satisfy the evasive constraint in case of detecting a fault. The processor 917 is further configured to process the feedback signal with the nominal controller 923 to produce the nominal control command maintaining the state of the ego vehicle within the determined region of the state of the ego vehicle. The processor 917 is further configured to evaluate the state function of the evasive controller 925 with a value of the control parameter from the determined region of the state of the ego vehicle to produce the evasive control command. The processor 917 is further configured to control the motion of the ego vehicle according to the nominal control command when the fault is not detected; and otherwise control the motion of the ego vehicle according to the evasive control command.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling motion of an ego vehicle, comprising:

a memory configured to store a nominal controller for controlling a nominal motion of the ego vehicle subject to a nominal constraint and an evasive controller for controlling an evasive maneuver of the ego vehicle subject to an evasive constraint different from the nominal constraint, wherein the nominal controller is configured to produce a nominal control command according to a movement objective of the ego vehicle, wherein the evasive controller is configured to produce an evasive control command by evaluating a state function of a control parameter; and a processor coupled with executable instructions, when executed by the processor, cause the control system to:

collect a feedback signal indicative of a current state of the ego vehicle and a current state of an environment of motion of the ego vehicle;

process the feedback signal to determine a region of the state of the ego vehicle uplifted with values of the control parameter allowing the evasive maneuver to satisfy the evasive constraint in case of detecting a fault, wherein the region of the state of the ego vehicle includes longitudinal and lateral positions of the ego vehicle, wherein the control parameter includes at least one of a lateral displacement, a stop point, or a target velocity, wherein the region of the state of the ego vehicle uplifted with the values of the control parameter corresponds to a region defined based on the longitudinal and lateral positions of the ego vehicle and the values of the control parameter, and wherein, to determine the region of the state of the ego vehicle uplifted with the values of the control parameter, the processor is configured to:

compute one or more regions where the evasive maneuver is within a risk zone at a future time instant;

compute a union of the one or more regions;

compute a complement of the union of the one or more regions;

compute a region where constraints and traffic rules are satisfied; and compute a safe region that corresponds to the region of the state of the vehicle, based on the complement of the union of the one or more regions, and the region where the constraints and the traffic rules are satisfied;

process the feedback signal with the nominal controller to produce the nominal control command maintaining the state of the ego vehicle within the determined region of the state of the ego vehicle;

evaluate the state function of the evasive controller with a value of the control parameter from the determined region of the state of the ego vehicle to produce the evasive control command; and control the motion of the ego vehicle according to the nominal control command when the fault is not detected; and otherwise control the motion of the ego vehicle according to the evasive control command.

2. The control system of claim 1, wherein the nominal controller is further configured to solve an optimization problem to produce the nominal control command and the value of the control parameter for evaluating the state function of the evasive controller.

3. The control system of claim 1, wherein the value of the control parameter for the evasive controller is selected according to the region of the state of the ego vehicle, based on the state of the ego vehicle when the fault is detected.

4. The control system of claim 1, wherein the memory is further configured to store a table including different faults and corresponding risk zones, corresponding constraints to be satisfied, corresponding traffic rules to be satisfied, and corresponding evasive controllers, wherein the processor is further configured to:

determine, based on the feedback signal, one or more possible faults in the environment;

detect if a fault from the one or more possible faults occurred in the environment;

determine, from the table, a risk zone, constraints to be satisfied, traffic rules to be satisfied, and an evasive controller, corresponding to the detected fault, wherein the determined evasive controller is configured to produce a corresponding evasive control command by evaluating a corresponding state function dependent on a corresponding control parameter; and control the motion of the ego vehicle according to the produced evasive control command.

5. The control system of claim 1, wherein the memory is further configured to store a set of evasive controllers for controlling different evasive maneuvers of the ego vehicle subject to corresponding evasive constraints different from the nominal constraint, wherein each of the different evasive controllers is configured to produce a corresponding evasive control command by evaluating a corresponding state function dependent on a corresponding control parameter, wherein the processor is further configured to:

classify the feedback signal to estimate likelihoods of different faults, wherein each fault defines a risk zone region of the ego vehicle;

select a corresponding evasive controller from the set of evasive controllers for each fault having the likelihood greater than a threshold;

determine for each selected evasive controller a corresponding region of the state of the ego vehicle uplifted with values of the corresponding control parameter allowing the selected evasive maneuver to satisfy the corresponding evasive constraint in case of detecting the corresponding fault; and evaluate the state function of the evasive controller selected for the detected fault, with a value of the corresponding control parameter from the region of the state of the ego vehicle uplifted with values of the corresponding control parameter.

6. The control system of claim 5, wherein, to classify the feedback signal, the processor is further configured to execute a neural network trained with machine learning.

7. The control system of claim 1, wherein, to compute the safe region as a convex safe region, the processor is further configured to:

select a point outside of the complement of the union of the one or more regions;

compute a projection from the selected point to each region of the one or more regions;

compute vectors of differences between the selected point and each of the projection of the selected point into each region;

construct, based on the computed vectors, one or more hyperplanes;

construct one or more halfspaces based on the one or more hyperplanes; and construct the convex safe region as intersection of the one or more halfspaces.

8. The control system of claim 1, wherein the processor is further configured to compute the safe region based on a relative motion model of the ego vehicle with respect to the risk zone.

9. The control system of claim 1, wherein the evasive controller is further configured to compute the evasive control command to generate the evasive maneuver by summing a first term and a second term, wherein the first term in obtained by multiplying the state of the ego vehicle by a first matrix and the second term is obtained by multiplying the control parameter by a second matrix.

10. The control system of claim 1, wherein the value of the control parameter is constant through the evasive maneuver.

11. The control system of claim 1, wherein the processor is further configured to solve an optimization problem to produce the nominal control command, wherein the region of the state of the ego vehicle uplifted with the values of the control parameter is enforced as a constraint in the optimization problem, and wherein the optimization problem is based a nominal model of vehicle motion.

12. The control system of claim 11, wherein the constraint and the nominal model of vehicle motion are linear, and the optimization problem is a quadratic program.

13. The control system of claim 1, wherein the processor is further configured to solve an optimization problem to produce the nominal control command, wherein the optimization problem includes binary decision variables which, for the fault, select a safe region and the evasive maneuver, wherein the region of the state of the ego vehicle uplifted with the values of the control parameter is enforced as a constraint in the optimization problem, and wherein the optimization problem is based a nominal model of vehicle motion.

14. The control system of claim 13, wherein the constraint and the nominal model of vehicle motion are linear, and the optimization problem is a mixed integer quadratic program.

15. The control system of claim 1, wherein the ego vehicle includes one or a combination of an autonomous vehicle and a semi-autonomous vehicle.

16. A method for controlling motion of an ego vehicle, wherein the method uses a processor coupled to a memory storing a nominal controller for controlling a nominal motion of the ego vehicle subject to a nominal constraint and an evasive controller for controlling an evasive maneuver of the ego vehicle subject to an evasive constraint different from the nominal constraint, wherein the nominal controller is configured to produce a nominal control command according to a movement objective of the ego vehicle, wherein the evasive controller is configured to produce an evasive control command by evaluating a state function of a control parameter, the processor is coupled with stored instructions when executed by the processor carry out steps of the method, comprising:

collecting a feedback signal indicative of a current state of the ego vehicle and a current state of an environment of motion of the ego vehicle;

processing the feedback signal to determine a region of the state of the ego vehicle uplifted with values of the control parameter allowing the evasive maneuver to satisfy the evasive constraint in case of detecting a fault, wherein the region of the state of the ego vehicle includes longitudinal and lateral positions of the ego vehicle, wherein the control parameter includes at least one of a lateral displacement, a stop point, or a target velocity, wherein the region of the state of the ego vehicle uplifted with the values of the control parameter corresponds to a region defined based on the longitudinal and lateral positions of the ego vehicle and the values of the control parameter, and wherein determining the region of the state of the ego vehicle uplifted with the values of the control parameter comprises:

computing one or more regions where the evasive maneuver is within a risk zone at a future time instant;

computing a union of the one or more regions;

computing a complement of the union of the one or more regions;

computing a region where constraints and traffic rules are satisfied; and computing a safe region that corresponds to the region of the state of the vehicle, based on the complement of the union of the one or more regions, and the region where the constraints and the traffic rules are satisfied;

processing the feedback signal with the nominal controller to produce the nominal control command maintaining the state of the ego vehicle within the determined region of the state of the ego vehicle;

evaluating the state function of the evasive controller with a value of the control parameter from the determined region of the state of the ego vehicle to produce the evasive control command; and controlling the motion of the ego vehicle according to the nominal control command when the fault is not detected; and otherwise controlling the motion of the ego vehicle according to the evasive control command.

17. The method of claim 16, wherein the nominal controller is further configured to solve an optimization problem to produce the nominal control command and the value of the control parameter for evaluating the state function of the evasive controller.

18. The method of claim 16, wherein the value of the control parameter for the evasive controller is selected according to the region of the state of the ego vehicle, based on the state of the ego vehicle when the fault is detected.

19. A non-transitory computer readable storage medium embodied thereon a program executable by a processor for performing a method, the storage medium stores a nominal controller for controlling a nominal motion of the ego vehicle subject to a nominal constraint and an evasive controller for controlling an evasive maneuver of the ego vehicle subject to an evasive constraint different from the nominal constraint, wherein the nominal controller is configured to produce a nominal control command according to a movement objective of the ego vehicle, wherein the evasive controller is configured to produce an evasive control command by evaluating a state function of a control parameter, the program when executed by the processor carry out steps of the method, comprising:

collecting a feedback signal indicative of a current state of the ego vehicle and a current state of an environment of motion of the ego vehicle;

processing the feedback signal to determine a region of the state of the ego vehicle uplifted with values of the control parameter allowing the evasive maneuver to satisfy the evasive constraint in case of detecting a fault, wherein the region of the state of the ego vehicle includes longitudinal and lateral positions of the ego vehicle, wherein the control parameter includes at least one of a lateral displacement, a stop point, or a target velocity, wherein the region of the state of the ego vehicle uplifted with the values of the control parameter corresponds to a region defined based on the longitudinal and lateral positions of the ego vehicle and the values of the control parameter, and wherein determining the region of the state of the ego vehicle uplifted with the values of the control parameter comprises:

computing one or more regions where the evasive maneuver is within a risk zone at a future time instant;

computing a union of the one or more regions;

computing a complement of the union of the one or more regions;

computing a region where constraints and traffic rules are satisfied; and computing a safe region that corresponds to the region of the state of the vehicle, based on the complement of the union of the one or more regions, and the region where the constraints and the traffic rules are satisfied;

processing the feedback signal with the nominal controller to produce the nominal control command maintaining the state of the ego vehicle within the determined region of the state of the ego vehicle;

evaluating the state function of the evasive controller with a value of the control parameter from the determined region of the state of the ego vehicle to produce the evasive control command; and controlling the motion of the ego vehicle according to the nominal control command when the fault is not detected; and otherwise controlling the motion of the ego vehicle according to the evasive control command.

* * * * *